(12) United States Patent
Tkachenko et al.

(10) Patent No.: US 12,020,383 B2
(45) Date of Patent: Jun. 25, 2024

(54) FACIAL SYNTHESIS IN AUGMENTED REALITY CONTENT FOR THIRD PARTY APPLICATIONS

(71) Applicant: Snap Inc., Santa Monica, CA (US)

(72) Inventors: Grigoriy Tkachenko, London (GB); Inna Zaitseva, Kiev (UA)

(73) Assignee: Snap Inc., Santa Monica, CA (US)

( * ) Notice: Subject to any disclaimer, the term of this patent is extended or adjusted under 35 U.S.C. 154(b) by 76 days.

(21) Appl. No.: 17/708,744

(22) Filed: Mar. 30, 2022

(65) Prior Publication Data

US 2022/0319127 A1 Oct. 6, 2022

Related U.S. Application Data

(60) Provisional application No. 63/200,882, filed on Mar. 31, 2021.

(51) Int. Cl.
*G06T 19/00* (2011.01)
*G06F 3/0482* (2013.01)
(Continued)

(52) U.S. Cl.
CPC .......... *G06T 19/006* (2013.01); *G06F 3/0482* (2013.01); *G06T 7/70* (2017.01);
(Continued)

(58) Field of Classification Search
CPC ............ G06N 3/049; G06N 3/02; G06N 3/08; G06N 20/00; G06N 3/088; G06N 5/022;
(Continued)

(56) References Cited

U.S. PATENT DOCUMENTS

2020/0234483 A1* 7/2020 Mashrabov ............. H04L 51/10
2022/0319127 A1* 10/2022 Tkachenko ............. G06V 10/82

FOREIGN PATENT DOCUMENTS

WO 2020150692 7/2020
WO WO-2020150692 A1 * 7/2020 ........... G06F 3/0482
(Continued)

OTHER PUBLICATIONS

"International Application Serial No. PCT/US2022/022545, International Search Report dated Jul. 15, 2022", 5 pgs.
(Continued)

*Primary Examiner* — Todd Buttram
(74) *Attorney, Agent, or Firm* — Schwegman Lundberg & Woessner, P.A.

(57) ABSTRACT

The subject technology receives a selection of a selectable graphical item to initiate generating augment reality content including facial synthesis, the selection being received by a third party application, the third party application being executed by a computing device separate from a first party application and a messaging server system. The subject technology captures image data by the client device. The subject technology generates, by the one or more hardware processors and based at least in part on frames of a source media content, sets of source pose parameters. The subject technology generates, based at least in part on sets of the source pose parameters, an output media content using an interface communicating with the messaging server system. The subject technology provides augmented reality content based at least in part on the output media content for display on the computing device.

20 Claims, 12 Drawing Sheets

(51) Int. Cl.
*G06T 7/70* (2017.01)
*G06V 40/16* (2022.01)

(52) U.S. Cl.
CPC ........ *G06V 40/174* (2022.01); *G06T 2200/24* (2013.01); *G06T 2207/20084* (2013.01); *G06T 2207/30201* (2013.01)

(58) Field of Classification Search
CPC ............... G06F 2111/18; G06F 3/0481; G06F 3/04817; G06F 9/4443; G06F 3/04847; G06F 11/3664; G06F 3/012; G06F 3/0304; G06F 3/011–015; G06V 20/20; G06T 19/00; G06T 17/00; G06T 7/00; G06T 19/006; G06T 2215/16; H04N 5/272; H04N 2201/3245; A63F 13/10; G02B 27/017
See application file for complete search history.

(56) References Cited

FOREIGN PATENT DOCUMENTS

| WO | WO-2020234852 A1 | * 11/2020 | ......... G06K 9/00288 |
| WO | WO-2022212503 A1 | 10/2022 | |

OTHER PUBLICATIONS

"International Application Serial No. PCT/US2022/022545, Written Opinion dated Jul. 15, 2022", 7 pgs.

Kim, Hyeongwoo, "Deep Video Portraits", arXiv: 1805.11714v1, (Aug. 2018), 14 pgs.

Liu, Ming-Yu, "Generative Adversarial Networks for Image and Video Synthesis: Algorithms and Applications", Arxiv.Org, Cornell University Library, 201 Olin Library Cornell University Ithaca, NY 14853, (Aug. 6, 2020), 21 pgs.

"International Application Serial No. PCT/US2022/022545, International Preliminary Report on Patentability dated Oct. 12, 2023", 9 pgs.

* cited by examiner

1000

```
┌─────────────────────────────────────────────────────────────┐
│ RECEIVE A SELECTION OF A SELECTABLE GRAPHICAL ITEM TO INITIATE │
│   GENERATING AUGMENT REALITY CONTENT INCLUDING FACIAL       │
│                         SYNTHESIS                            │
│                           1002                               │
└─────────────────────────────────────────────────────────────┘
                              │
                              ▼
┌─────────────────────────────────────────────────────────────┐
│         CAPTURE IMAGE DATA BY THE COMPUTING DEVICE          │
│                           1004                               │
└─────────────────────────────────────────────────────────────┘
                              │
                              ▼
┌─────────────────────────────────────────────────────────────┐
│ GENERATE, BASED AT LEAST IN PART ON FRAMES OF A SOURCE MEDIA │
│       CONTENT, SETS OF SOURCE POSE PARAMETERS               │
│                           1006                               │
└─────────────────────────────────────────────────────────────┘
                              │
                              ▼
┌─────────────────────────────────────────────────────────────┐
│ GENERATE, BASED AT LEAST IN PART ON SETS OF THE SOURCE POSE │
│  PARAMETERS, AN OUTPUT MEDIA CONTENT USING AN INTERFACE     │
│       COMMUNICATING WITH THE MESSAGING SYSTEM               │
│                           1008                               │
└─────────────────────────────────────────────────────────────┘
                              │
                              ▼
┌─────────────────────────────────────────────────────────────┐
│ PROVIDE AUGMENTED REALITY CONTENT BASED AT LEAST IN PART ON │
│   THE OUTPUT MEDIA CONTENT FOR DISPLAY ON THE COMPUTING     │
│                          DEVICE                              │
│                           1010                               │
└─────────────────────────────────────────────────────────────┘
```

FIG. 10

FACIAL SYNTHESIS IN AUGMENTED REALITY CONTENT FOR THIRD PARTY APPLICATIONS

PRIORITY CLAIM

This application claims the benefit of priority of U.S. Provisional Patent Application No. 63/200,882, filed Mar. 31, 2021, which is hereby incorporated by reference herein in its entirety for all purposes.

BACKGROUND

With the increased use of digital images, affordability of portable computing devices, availability of increased capacity of digital storage media, and increased bandwidth and accessibility of network connections, digital images have become a part of the daily life for an increasing number of people.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 10 is a flowchart illustrating a method, according to certain example embodiments.

DETAILED DESCRIPTION

Figure 1:
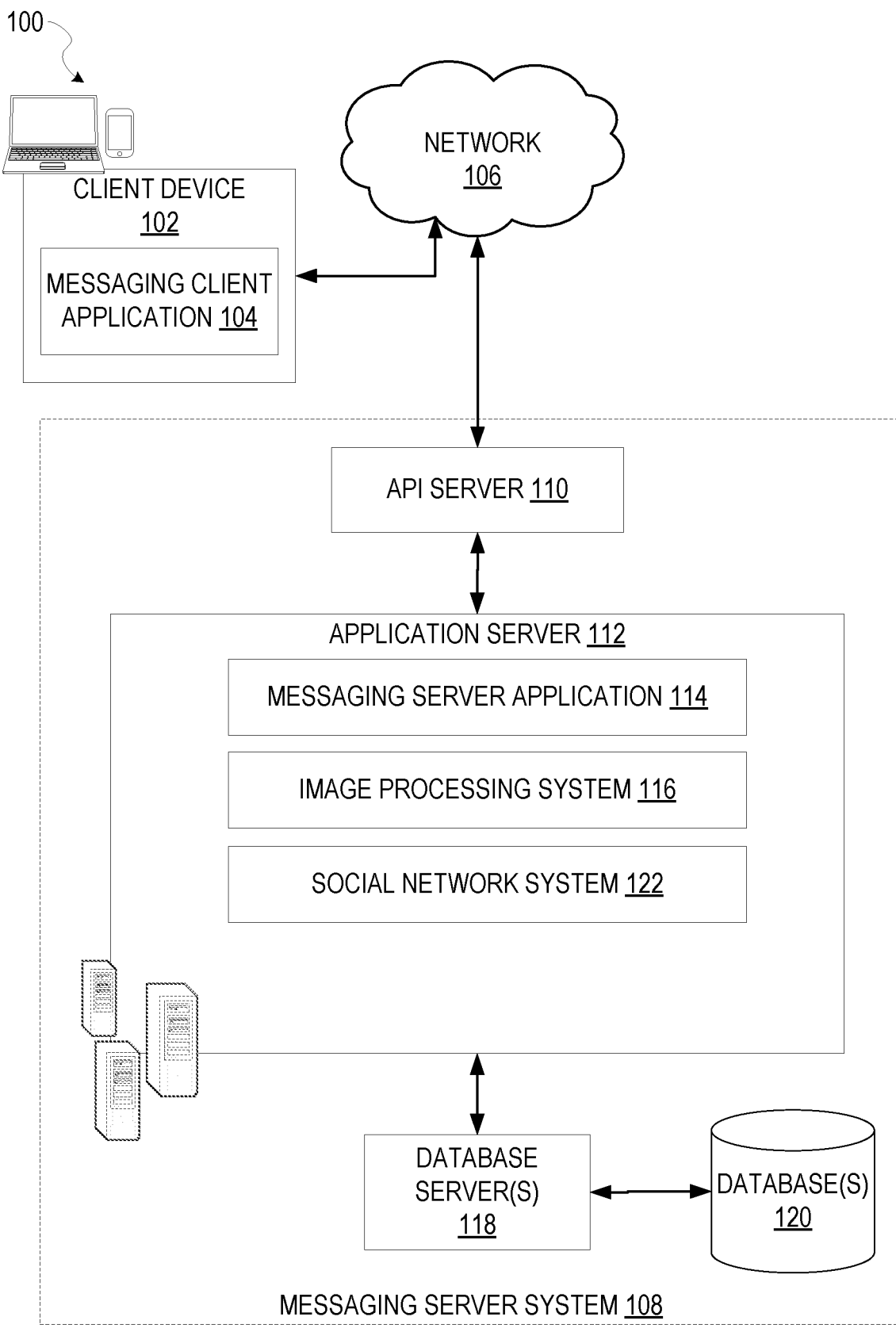
FIG. 1 is a diagrammatic representation of a networked environment in which the present disclosure may be deployed, in accordance with some example embodiments.

Users with a range of interests from various locations can capture digital images of various subjects and make captured images available to others via networks, such as the Internet. To enhance users' experiences with digital images and provide various features, enabling computing devices to perform image processing operations on various objects and/or features captured in a wide range of changing conditions (e.g., changes in image scales, noises, lighting, movement, or geometric distortion) can be challenging and computationally intensive.

Augmented reality technology aims to bridge a gap between virtual environments and a real world environment by providing an enhanced real world environment that is augmented with electronic information. As a result, the electronic information appears to be part of the real world environment as perceived by a user. In an example, augmented reality technology further provides a user interface to interact with the electronic information that is overlaid in the enhanced real world environment.

As mentioned above, with the increased use of digital images, affordability of portable computing devices, availability of increased capacity of digital storage media, and increased bandwidth and accessibility of network connections, digital images have become a part of the daily life for an increasing number of people. Users with a range of interests from various locations can capture digital images of various subjects and make captured images available to others via networks, such as the Internet. To enhance users' experiences with digital images and provide various features, enabling computing devices to perform image processing operations on various objects and/or features captured in a wide range of changing conditions (e.g., changes in image scales, noises, lighting, movement, or geometric distortion) can be challenging and computationally intensive.

Messaging systems are frequently utilized and are increasingly leveraged by users of mobile computing devices, in various settings, to provide different types of functionality in a convenient manner. As described herein, the subject messaging system comprises practical applications that provide improvements in rendering augmented reality content generators (e.g., providing augmented reality experiences) on media content (e.g., images, videos, and the like) in which a particular augmented reality content generator may be activated through an improved system that enables providing augmented reality content that are more advantageously tailored for specific requirements associated with online advertising campaigns of respective entities (e.g., merchants, companies, individuals, and the like).

Embodiments of the subject technology enable face animation synthesis that may include transferring a facial expression of a source individual in a source video to a target individual in a target video or a target image. The face animation synthesis can be used for manipulation and animation of faces in many applications, such as entertainment shows, computer games, video conversations, virtual reality, augmented reality, and the like.

Some current techniques for face animation synthesis utilize morphable face models to re-render the target face with a different facial expression. While generation of a face with a morphable face model can be fast, the generated face may not be photorealistic. Some other current techniques for face animation synthesis are time-consuming and may not be suitable to perform a real-time face animation synthesis on regular mobile devices.

Messaging systems are frequently utilized and are increasingly leveraged by users of mobile computing devices, in various settings, to provide different types of functionality in a convenient manner. As described herein, the subject messaging system comprises practical applications that provide improvements in capturing image data and rendering AR content (e.g., images, videos, and the like) based on the captured image data by at least providing technical improvements with capturing image data using power and resource constrained electronic devices. Such improvements in capturing image data are enabled by techniques provided by the subject technology, which reduce latency and increase efficiency in processing captured image data thereby also reducing power consumption in the capturing devices.

As discussed further herein, the subject infrastructure supports the creation and sharing of interactive media, referred to herein as messages including 3D content or AR effects, throughout various components of a messaging system. In example embodiments described herein, messages can enter the system from a live camera or via from storage (e.g., where messages including 3D content and/or AR effects are stored in memory or a database). The subject system supports motion sensor input, and loading of external effects and asset data.

As referred to herein, the phrase "augmented reality experience," "augmented reality content item," "augmented reality content generator" includes or refers to various image processing operations corresponding to an image modification, filter, AR content generators, media overlay, transformation, and the like, and additionally can include playback of audio or music content during presentation of AR content or media content, as described further herein.

FIG. 1 is a block diagram showing an example messaging system 100 for exchanging data (e.g., messages and associated content) over a network. The messaging system 100 includes multiple instances of a client device 102 (e.g., a computing device), each of which hosts a number of applications including a messaging client application 104. Each messaging client application 104 is communicatively coupled to other instances of the messaging client application 104 and a messaging server system 108 via a network 106 (e.g., the Internet).

A messaging client application 104 is able to communicate and exchange data with another messaging client application 104 and with the messaging server system 108 via the network 106. The data exchanged between messaging client application 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include, message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

The Application Program Interface (API) server 110 receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, and opening an application event (e.g., relating to the messaging client application 104).

The application server 112 hosts a number of applications and subsystems, including a messaging server application 114, an image processing system 116 and a social network system 122. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

Figure 3:
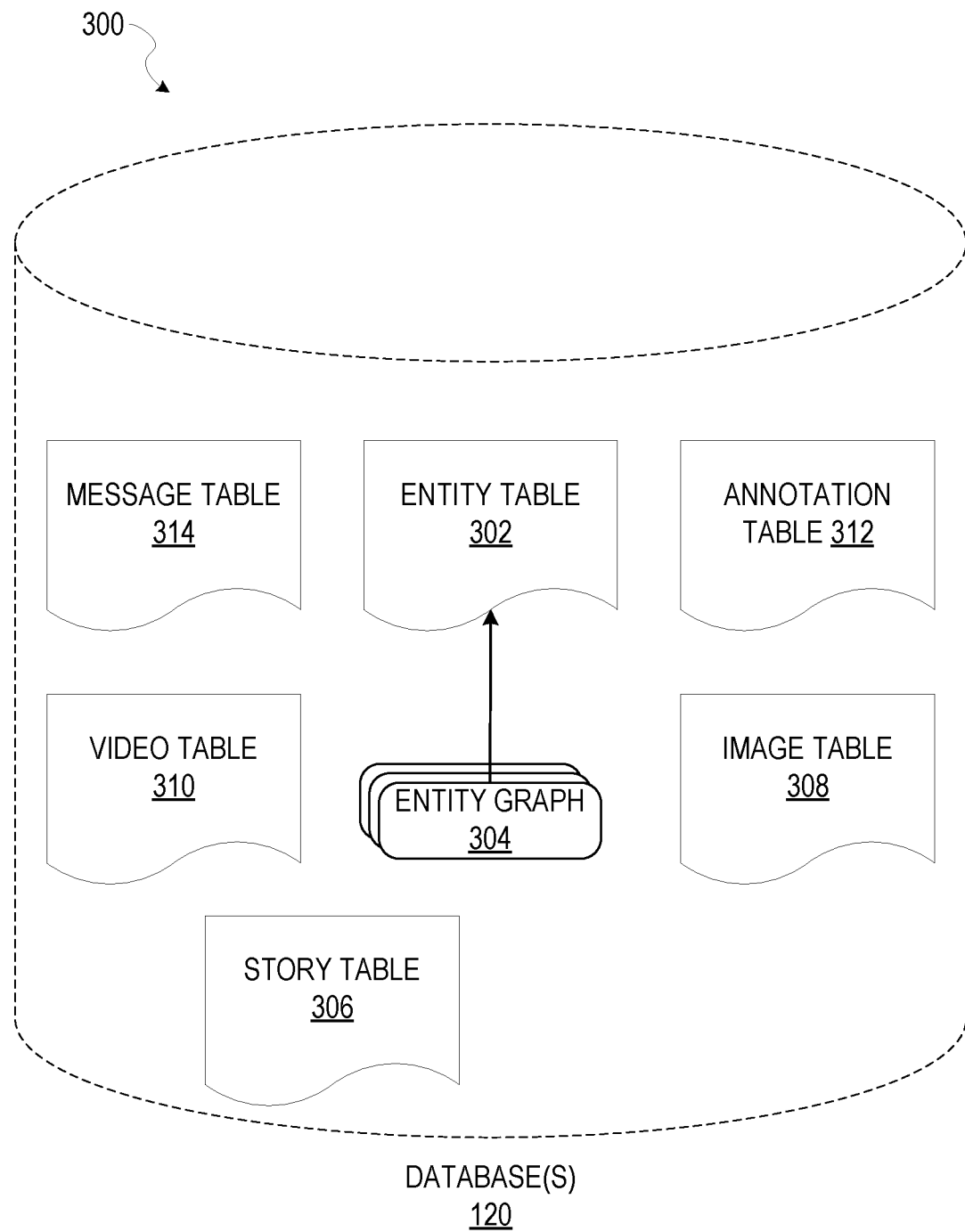
FIG. 3 is a diagrammatic representation of a data structure as maintained in a database, in accordance with some example embodiments.

The social network system 122 supports various social networking functions services, and makes these functions and services available to the messaging server application 114. To this end, the social network system 122 maintains and accesses an entity graph 304 (as shown in FIG. 3) within the database 120. Examples of functions and services supported by the social network system 122 include the identification of other users of the messaging system 100 with which a particular user has relationships or is 'following', and also the identification of other entities and interests of a particular user.

The application server 112 is communicatively coupled to a database server 118, which facilitates access to a database 120 in which is stored data associated with messages processed by the messaging server application 114.

Figure 2:
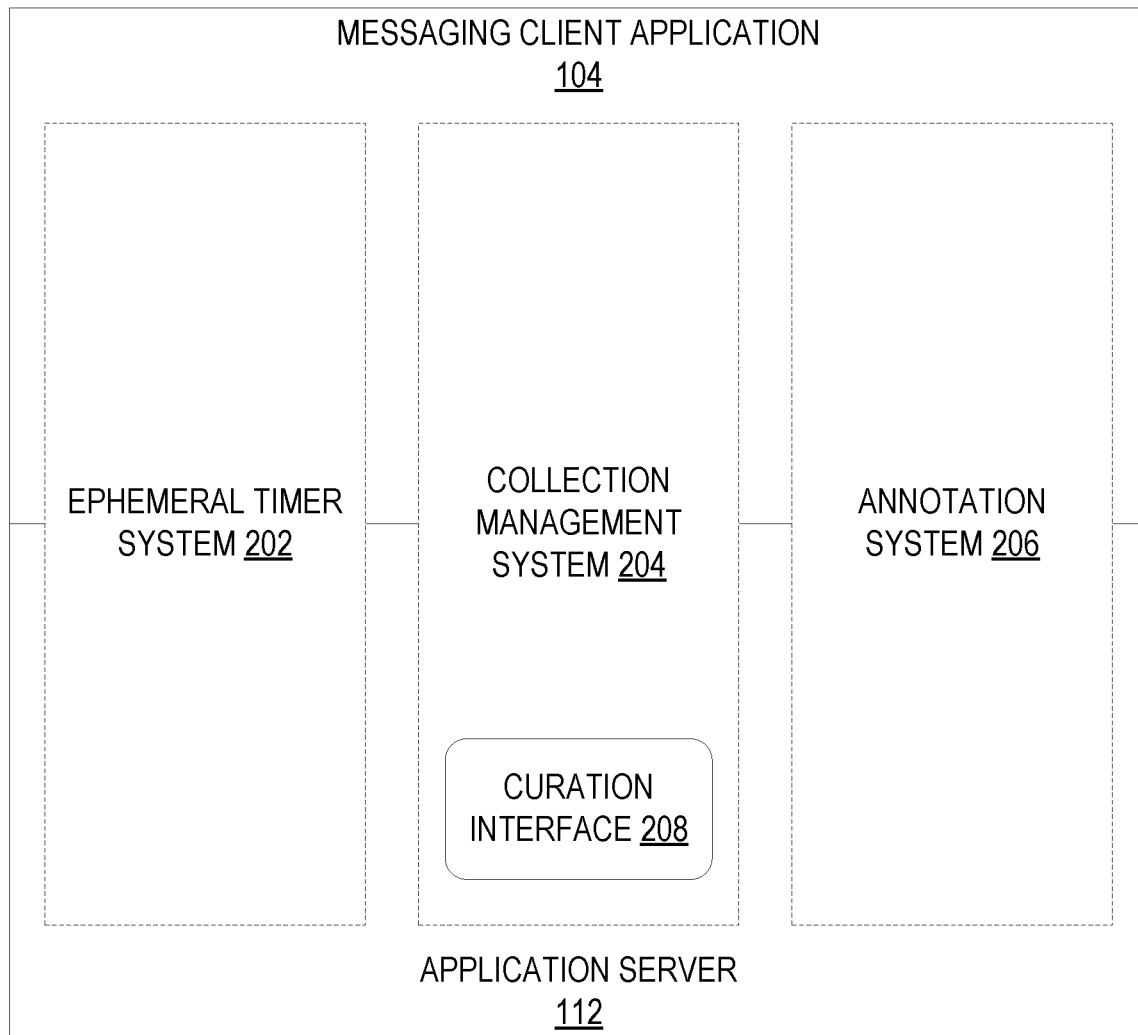
FIG. 2 is a diagrammatic representation of a messaging client application, in accordance with some example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a story), selectively display and enable access to messages and associated content via the messaging client application 104. Further details regarding the operation of the ephemeral timer system 202 are provided below.

The collection management system 204 is responsible for managing collections of media (e.g., collections of text, image video and audio data). In some examples, a collection of content (e.g., messages, including images, video, text and audio) may be organized into an 'event gallery' or an 'event story.' Such a collection may be made available for a specified time period, such as the duration of an event to which the content relates. For example, content relating to a music concert may be made available as a 'story' for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay or supplementation (e.g., an image filter) to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time.

FIG. 3 is a schematic diagram illustrating data structures 300 which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 314. The entity table 302 stores entity data, including an entity graph 304. Entities for which records are maintained within the entity table 302 may include individuals, corporate entities, organizations, objects, places, events, etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization) interested-based or activity-based, merely for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of varies types, including user-selected filters from a gallery of filters presented to a sending user by the messaging client application 104 when the sending user is composing a message. Other types of filters include geolocation filters (also known as geo-filters) which may be presented to a sending user based on geographic location. For example, geolocation filters specific to a neighborhood or special location may be presented within a user interface by the messaging client application 104, based on geolocation information determined by a GPS unit of the client device 102. Another type of filer is a data filer, which may be selectively presented to a sending user by the messaging client application 104, based on other inputs or information gathered by the client device 102 during the message creation process. Example of data filters include current temperature at a specific location, a current speed at which a sending user is traveling, battery life for a client device 102, or the current time.

Other annotation data that may be stored within the image table 308 are augmented reality content generators (e.g., corresponding to applying AR content generators, augmented reality experiences, or augmented reality content items). An augmented reality content generator may be a real-time special effect and sound that may be added to an image or a video.

As described above, augmented reality content generators, augmented reality content items, overlays, image transformations, AR images and similar terms refer to modifications that may be made to videos or images. This includes real-time modification which modifies an image as it is captured using a device sensor and then displayed on a screen of the device with the modifications. This also includes modifications to stored content, such as video clips in a gallery that may be modified. For example, in a device with access to multiple augmented reality content generators, a user can use a single video clip with multiple augmented reality content generators to see how the different augmented reality content generators will modify the stored clip. For example, multiple augmented reality content generators that apply different pseudorandom movement models can be applied to the same content by selecting different augmented reality content generators for the content. Similarly, real-time video capture may be used with an illustrated modification to show how video images currently being captured by sensors of a device would modify the captured data. Such data may simply be displayed on the screen and not stored in memory, or the content captured by the device sensors may be recorded and stored in memory with or without the modifications (or both). In some systems, a preview feature can show how different augmented reality content generators will look within different windows in a display at the same time. This can, for example, enable multiple windows with different pseudorandom animations to be viewed on a display at the same time.

Data and various systems using augmented reality content generators or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various embodiments, different methods for achieving such transformations may be used. For example, some embodiments may involve generating a three-dimensional mesh model of the object or objects, and using transformations and animated textures of the model within the video to achieve the transformation. In other embodiments, tracking of points on an object may be used to place an image or texture (which may be two dimensional or three dimensional) at the tracked position. In still further embodiments, neural network analysis of video frames may be used to place images, models, or textures in content (e.g., images or frames of video). Augmented reality content generators thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some embodiments, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each of element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In one or more embodiments, transformations changing some areas of an object using its elements can be performed by calculating of characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various embodiments, any combination of such modifications or other similar modifications may be used. For certain models to be animated, some characteristic points can be selected as control points to be used in determining the entire state-space of options for the model animation.

In some embodiments of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

In other embodiments, other methods and algorithms suitable for face detection can be used. For example, in some embodiments, features are located using a landmark which represents a distinguishable point present in most of the images under consideration. For facial landmarks, for example, the location of the left eye pupil may be used. In an initial landmark is not identifiable (e.g., if a person has an eyepatch), secondary landmarks may be used. Such landmark identification procedures may be used for any such objects. In some embodiments, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some embodiments, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable and the shape model pools the results of the weak template matchers to form a stronger overall classifier. The entire search is repeated at each level in an image pyramid, from coarse to fine resolution.

Embodiments of a transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some example embodiments, a computer animation model to transform image data can be used by a system where a user may capture an image or video stream of the user (e.g., a selfie) using a client device 102 having a neural network operating as part of a messaging client application 104 operating on the client device 102. The transform system operating within the messaging client application 104 determines the presence of a face within the image or video stream and provides modification icons associated with a computer animation model to transform image data, or the computer animation model can be present as associated with an interface described herein. The modification icons include changes which may be the basis for modifying the user's face within the image or video stream as part of the modification operation. Once a modification icon is selected, the transform system initiates a process to convert the image of the user to reflect the selected modification icon (e.g., generate a smiling face on the user). In some embodiments, a modified image or video stream may be presented in a graphical user interface displayed on the mobile client device as soon as the image or video stream is captured and a specified modification is selected. The transform system may implement a complex convolutional neural network on a portion of the image or video stream to generate and apply the selected modification. That is, the user may capture the image or video stream and be presented with a modified result in real time or near real time once a modification icon has been selected. Further, the modification may be persistent while the video stream is being captured and the selected modification icon remains toggled. Machine taught neural networks may be used to enable such modifications.

In some embodiments, the graphical user interface, presenting the modification performed by the transform system, may supply the user with additional interaction options. Such options may be based on the interface used to initiate the content capture and selection of a particular computer animation model (e.g., initiation from a content creator user interface). In various embodiments, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some embodiments, individual faces, among a group of multiple faces, may be individually modified or such modifications may be individually toggled by tapping or selecting the individual face or a series of individual faces displayed within the graphical user interface.

In some example embodiments, a graphical processing pipeline architecture is provided that enables different augmented reality experiences (e.g., AR content generators) to be applied in corresponding different layers. Such a graphical processing pipeline provides an extensible rendering engine for providing multiple augmented reality experiences that are included in a composite media (e.g., image or video) or composite AR content for rendering by the messaging client application 104 (or the messaging system 100).

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a story or a gallery). The creation of a particular collection may be initiated by a particular user (e.g., each user for which a record is maintained in the entity table 302). A user may create a 'personal story' in the form of a collection of content that has been created and sent/broadcast by that user. To this end, the user interface of the messaging client application 104 may include an icon that is user-selectable to enable a sending user to add specific content to his or her personal story.

A collection may also constitute a 'live story,' which is a collection of content from multiple users that is created manually, automatically, or using a combination of manual and automatic techniques. For example, a 'live story' may constitute a curated stream of user-submitted content from varies locations and events. Users whose client devices have location services enabled and are at a common location event at a particular time may, for example, be presented with an option, via a user interface of the messaging client application 104, to contribute content to a particular live story. The live story may be identified to the user by the messaging client application 104, based on his or her location. The end result is a 'live story' told from a community perspective.

A further type of content collection is known as a 'location story', which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
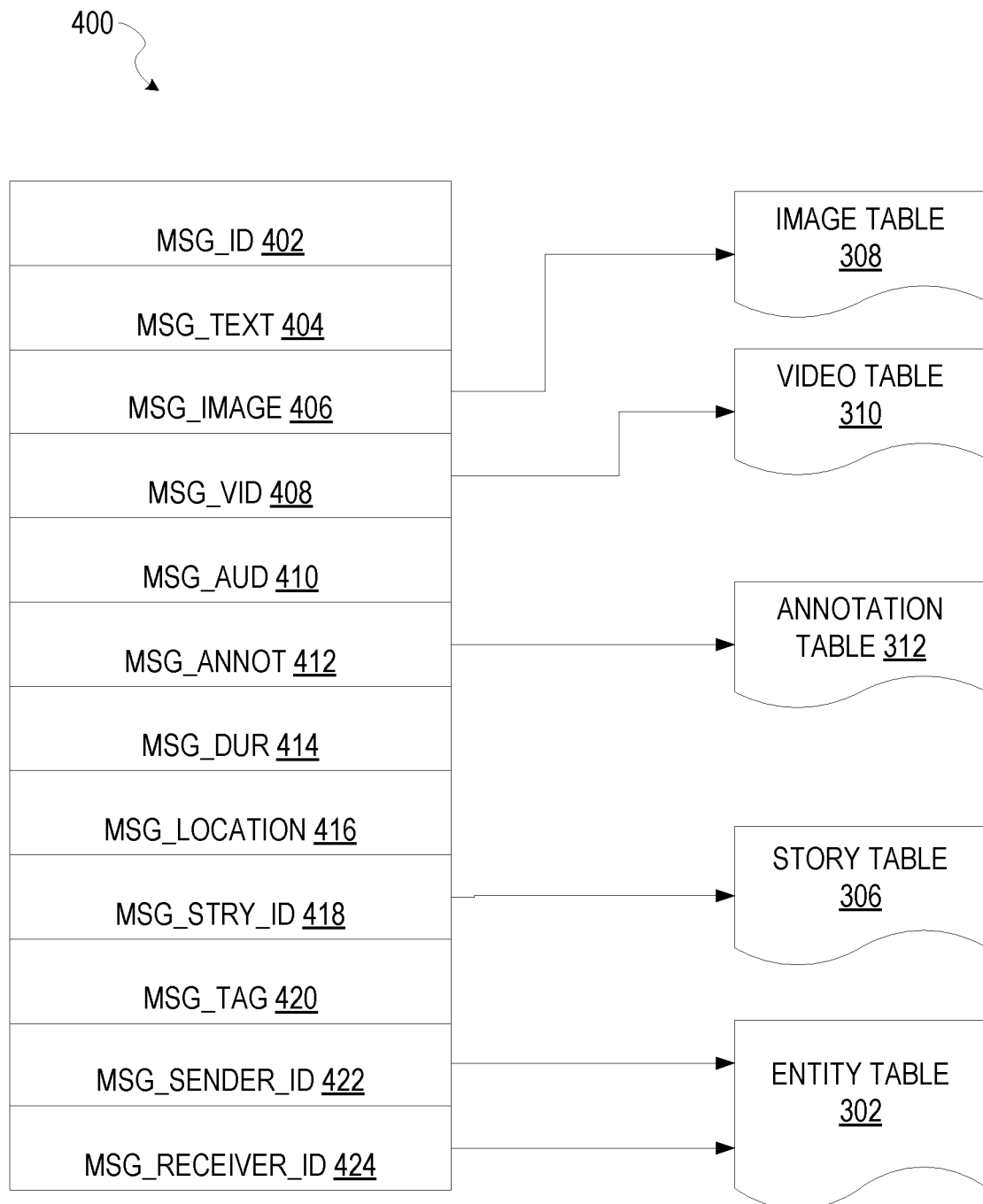
FIG. 4 is a diagrammatic representation of a message, in accordance with some example embodiments.

FIG. 4 is a schematic diagram illustrating a structure of a message 400, according to some embodiments, generated by a messaging client application 104 or the messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as 'in-transit' or 'in-flight' data of the client device 102 or the application server 112. The message 400 is shown to include the following components:

A message identifier 402: a unique identifier that identifies the message 400.

A message text payload 404: text, to be generated by a user via a user interface of the client device 102 and that is included in the message 400.

A message image payload 406: image data, captured by a camera component of a client device 102 or retrieved from a memory component of a client device 102, and that is included in the message 400.

A message video payload 408: video data, captured by a camera component or retrieved from a memory component of the client device 102 and that is included in the message 400.

A message audio payload 410: audio data, captured by a microphone or retrieved from a memory component of the client device 102, and that is included in the message 400.

A message annotations 412: annotation data (e.g., filters, stickers or other enhancements) that represents annotations to be applied to message image payload 406, message video payload 408, or message audio payload 410 of the message 400.

A message duration parameter 414: parameter value indicating, in seconds, the amount of time for which content of the message (e.g., the message image payload 406, message video payload 408, message audio payload 410) is to be presented or made accessible to a user via the messaging client application 104.

A message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).

A message story identifier 418: identifier values identifying one or more content collections (e.g., 'stories') with which a particular content item in the message image payload 406 of the message 400 is associated. For example, multiple images within the message image payload 406 may each be associated with multiple content collections using identifier values.

A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the client device 102 on which the message 400 was generated and from which the message 400 was sent A message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an entity table 302.

As described above, media overlays, such as AR content generators, overlays, image transformations, AR images and similar terms refer to modifications that may be made to videos or images. This includes real-time modification which modifies an image as it is captured using a device sensor and then displayed on a screen of the device with the modifications. This also includes modifications to stored content, such as video clips in a gallery that may be modified. For example, in a device with access to multiple media overlays (e.g., AR content generators), a user can use a single video clip with multiple AR content generators to see how the different AR content generators will modify the stored clip. For example, multiple AR content generators that apply different pseudorandom movement models can be applied to the same content by selecting different AR content generators for the content. Similarly, real-time video capture may be used with an illustrated modification to show how video images currently being captured by sensors of a device would modify the captured data. Such data may simply be displayed on the screen and not stored in memory, or the content captured by the device sensors may be recorded and stored in memory with or without the modifications (or both). In some systems, a preview feature can show how different AR content generators will look within different windows in a display at the same time. This can, for example, enable multiple windows with different pseudo-random animations to be viewed on a display at the same time.

Data and various systems to use AR content generators or other such transform systems to modify content using this data can thus involve detection of objects (e.g. faces, hands, bodies, cats, dogs, surfaces, objects, etc.), tracking of such objects as they leave, enter, and move around the field of view in video frames, and the modification or transformation of such objects as they are tracked. In various embodiments, different methods for achieving such transformations may be used. For example, some embodiments may involve generating a three-dimensional mesh model of the object or objects, and using transformations and animated textures of the model within the video to achieve the transformation. In other embodiments, tracking of points on an object may be used to place an image or texture (which may be two dimensional or three dimensional) at the tracked position. In still further embodiments, neural network analysis of video frames may be used to place images, models, or textures in content (e.g. images or frames of video). Lens data thus refers both to the images, models, and textures used to create transformations in content, as well as to additional modeling and analysis information needed to achieve such transformations with object detection, tracking, and placement.

Real time video processing can be performed with any kind of video data, (e.g. video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some embodiments, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each of element of an object are calculated (e.g. using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method a background of the modified object can be changed or distorted as well by tracking and modifying the background.

In one or more embodiments, transformations changing some areas of an object using its elements can be performed by calculating of characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve: changing color of areas; removing at least some part of areas from the frames of the video stream; including one or more new objects into areas which are based on a request for modification; and modifying or distorting the elements of an area or object. In various embodiments, any combination of such modifications or other similar modifications may be used. For certain models to be animated, some characteristic points can be selected as control points to be used in determining the entire state-space of options for the model animation.

In some embodiments of a computer animation model to transform image data using face detection, the face is detected on an image with use of a specific face detection algorithm (e.g. Viola-Jones). Then, an Active Shape Model (ASM) algorithm is applied to the face region of an image to detect facial feature reference points.

In other embodiments, other methods and algorithms suitable for face detection can be used. For example, in some embodiments, features are located using a landmark which represents a distinguishable point present in most of the images under consideration. For facial landmarks, for example, the location of the left eye pupil may be used. In an initial landmark is not identifiable (e.g. if a person has an eyepatch), secondary landmarks may be used. Such landmark identification procedures may be used for any such objects. In some embodiments, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some embodiments, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable and the shape model pools the results of the weak template matchers to form a stronger overall classifier. The entire search is repeated at each level in an image pyramid, from coarse to fine resolution.

Embodiments of a transformation system can capture an image or video stream on a client device and perform complex image manipulations locally on a client device such as client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on a client device.

In some example embodiments, a computer animation model to transform image data can be used by a system where a user may capture an image or video stream of the user (e.g., a selfie) using a client device 102 having a neural network operating as part of a messaging client application 104 operating on the client device 102. The transform system operating within the messaging client application 104 determines the presence of a face within the image or video stream and provides modification icons associated with a computer animation model to transform image data, or the computer animation model can be present as associated with an interface described herein. The modification icons include changes which may be the basis for modifying the user's face within the image or video stream as part of the modification operation. Once a modification icon is selected, the transform system initiates a process to convert the image of the user to reflect the selected modification icon (e.g., generate a smiling face on the user). In some embodiments, a modified image or video stream may be presented in a graphical user interface displayed on the mobile client device as soon as the image or video stream is captured and a specified modification is selected. The transform system may implement a complex convolutional neural network on a portion of the image or video stream to generate and apply the selected modification. That is, the user may capture the image or video stream and be presented with a modified result in real time or near real time once a modification icon has been selected. Further, the modification may be persistent while the video stream is being captured and the selected modification icon remains toggled. Machine taught neural networks may be used to enable such modifications.

In some embodiments, the graphical user interface, presenting the modification performed by the transform system, may supply the user with additional interaction options. Such options may be based on the interface used to initiate the content capture and selection of a particular computer animation model (e.g. initiation from a content creator user interface). In various embodiments, a modification may be persistent after an initial selection of a modification icon. The user may toggle the modification on or off by tapping or otherwise selecting the face being modified by the transformation system. and store it for later viewing or browse to other areas of the imaging application. Where multiple faces are modified by the transformation system, the user may toggle the modification on or off globally by tapping or selecting a single face modified and displayed within a graphical user interface. In some embodiments, individual faces, among a group of multiple faces, may be individually modified or such modifications may be individually toggled by tapping or selecting the individual face or a series of individual faces displayed within the graphical user interface.

In some example embodiments, a graphical processing pipeline architecture is provided that enables different media overlays to be applied in corresponding different layers. Such a graphical processing pipeline provides an extensible rendering engine for providing multiple augmented reality content generators that are included in a composite media (e.g., image or video) or composite AR content for rendering by the messaging client application 104 (or the messaging system 100).

As discussed herein, the subject infrastructure supports the creation and sharing of interactive messages with interactive effects throughout various components of the messaging system 100. In an example, to provide such interactive effects, a given interactive message may include image data along with 2D data, or 3D data. The infrastructure as described herein enables other forms of 3D and interactive media (e.g., 2D media content) to be provided across the subject system, which allows for such interactive media to be shared across the messaging system 100 and alongside photo and video messages. In example embodiments described herein, messages can enter the system from a live camera or via from storage (e.g., where messages with 2D or 3D content or augmented reality (AR) effects (e.g., 3D effects, or other interactive effects are stored in memory or a database). In an example of an interactive message with 3D data, the subject system supports motion sensor input and manages the sending and storage of 3D data, and loading of external effects and asset data.

As mentioned above, an interactive message includes an image in combination with a 2D effect, or a 3D effect and depth data. In an example embodiment, a message is rendered using the subject system to visualize the spatial detail/geometry of what the camera sees, in addition to a traditional image texture. When a viewer interacts with this message by moving a client device, the movement triggers corresponding changes in the perspective the image and geometry are rendered at to the viewer.

In an embodiment, the subject system provides AR effects (which may include 3D effects using 3D data, or interactive 2D effects that do not use 3D data) that work in conjunction with other components of the system to provide particles, shaders, 2D assets and 3D geometry that can inhabit different 3D-planes within messages. The AR effects as described herein, in an example, are rendered in a real-time manner for the user.

As mentioned herein, a gyro-based interaction refers to a type of interaction in which a given client device's rotation is used as an input to change an aspect of the effect (e.g., rotating phone along x-axis in order to change the color of a light in the scene).

As mentioned herein, an augmented reality content generator refers to a real-time special effect and/or sound that may be added to a message and modifies image and/or 3D data with an AR effects and/other 3D content such as 3D animated graphical elements, 3D objects (e.g., non-animated), and the like.

The following discussion relates to example data that is stored in connection with such a message in accordance to some embodiments.

Figure 5:
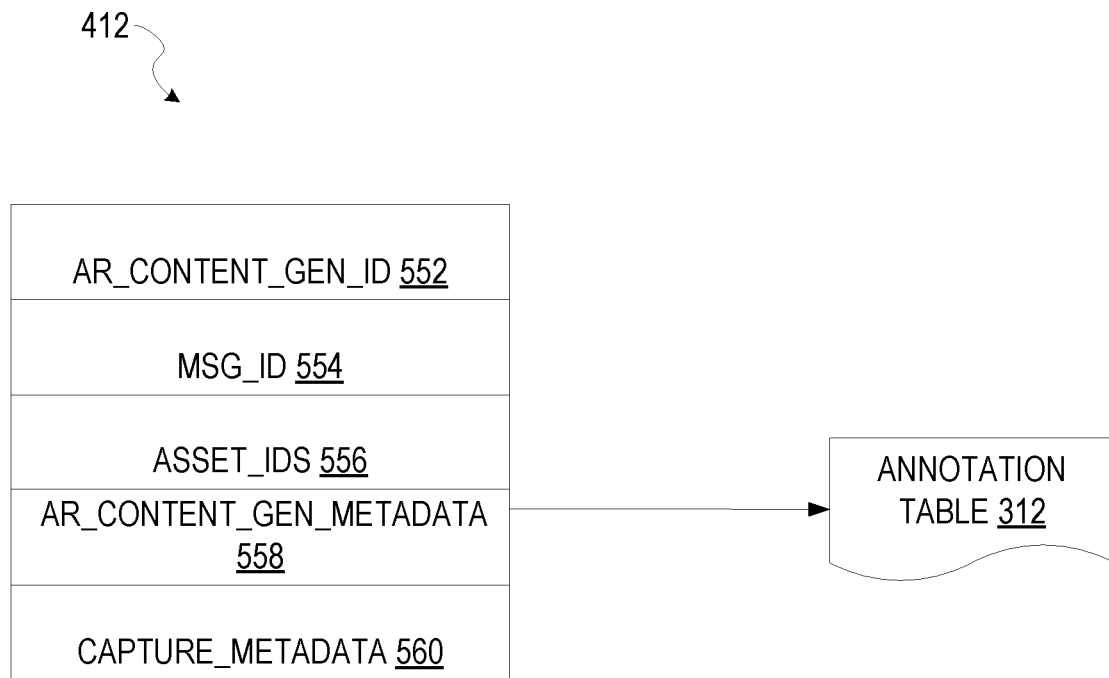
FIG. 5 is a schematic diagram illustrating a structure of the message annotations, as described in FIG. 4, including additional information corresponding to a given message, according to some embodiments.

FIG. 5 is a schematic diagram illustrating a structure of the message annotations 412, as described above in FIG. 4, including additional information corresponding to a given message, according to some embodiments, generated by the messaging client application 104 or the messaging client application 104.

Figure 6:
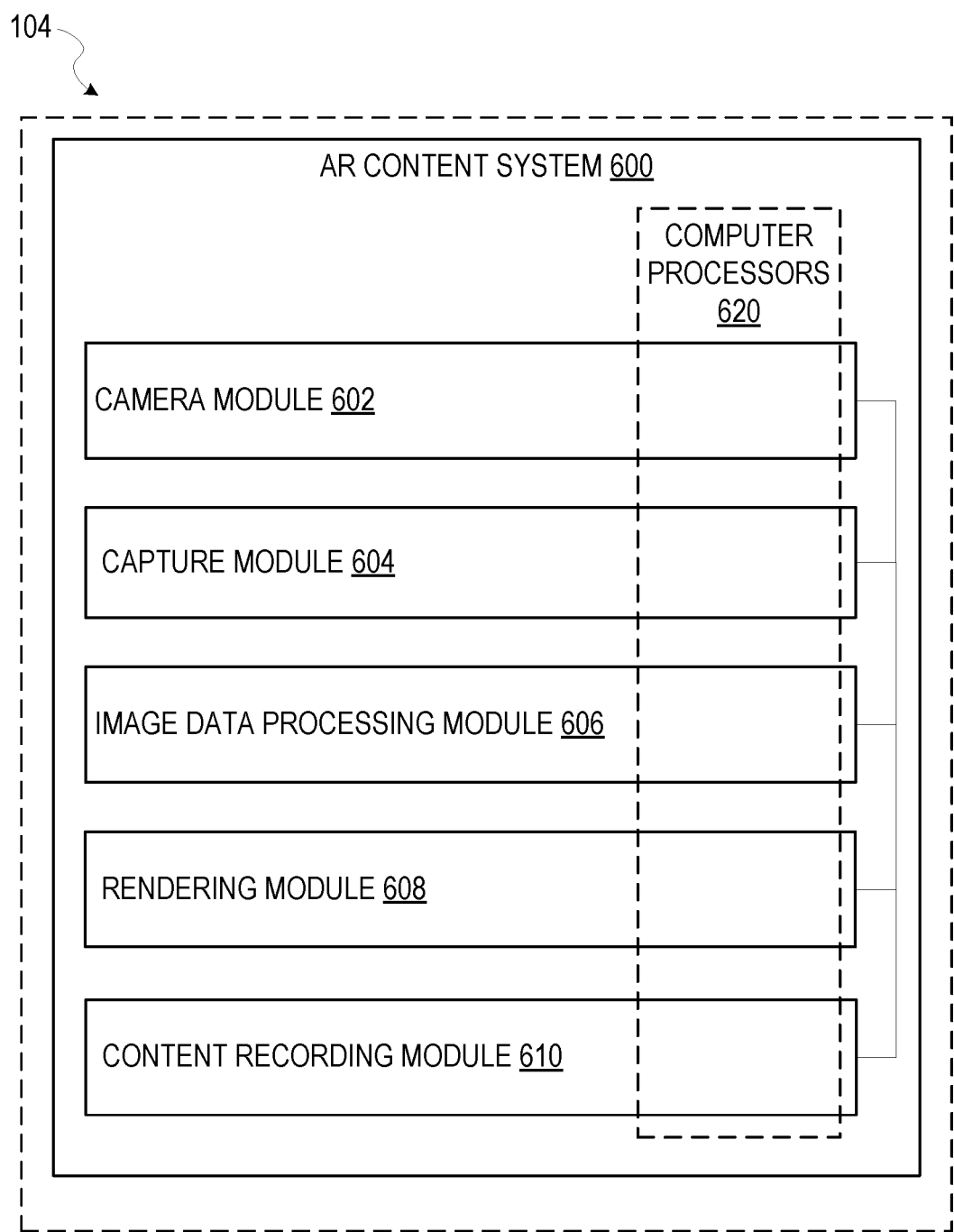
FIG. 6 is a block diagram illustrating various modules of a messaging client application, according to certain example embodiments.

In an embodiment, the content of a particular message 400, as shown in FIG. 3, including the additional data shown in FIG. 5 is used to populate the message table 314 stored within the database 120 for a given message, which is then accessible by the messaging client application 104. As illustrated in FIG. 5, message annotations 412 includes the following components corresponding to various data:

augmented reality (AR) content identifier 552: identifier of an AR content generator utilized in the message
message identifier 554: identifier of the message
asset identifiers 556: a set of identifiers for assets in the message. For example, respective asset identifiers can be included for assets that are determined by the particular AR content generator. In an embodiment, such assets are created by the AR content generator on the sender side client device, uploaded to the messaging server application 114, and utilized on the receiver side client device in order to recreate the message. Examples of typical assets include:
The original still RGB image(s) captured by the camera
The post-processed image(s) with AR content generator effects applied to the original image
augmented reality (AR) content metadata 558: additional metadata associated with the AR content generator corresponding to the AR identifier 552, such as:
AR content generator category: corresponding to a type or classification for a particular AR content generator AR content generator carousel index
  carousel group: This can be populated and utilized when eligible post-capture AR content generators are inserted into a carousel interface. In an implementation, a new value "AR_DEFAULT_GROUP" (e.g., a default group assigned to an AR content generator can be added to the list of valid group names.
capture metadata 560 corresponding to additional metadata, such as:
  camera image metadata
    camera intrinsic data
      focal length
      principal point
      other camera information (e.g., camera position)
    sensor information
      gyroscopic sensor data
      position sensor data
      accelerometer sensor data
      other sensor data
      location sensor data FIG. 6 is a block diagram illustrating various modules of a messaging client application 104, according to certain example embodiments. The messaging client application 104 is shown as including an AR content system 600. As further shown, the AR content system 600 includes a camera module 602, a capture module 604, an image data processing module 606, a rendering module 608, and a content recording module 610. The various modules of the AR content system 600 are configured to communicate with each other (e.g., via a bus, shared memory, or a switch). Any one or more of these modules may be implemented using one or more computer processors 620 (e.g., by configuring such one or more computer processors to perform functions described for that module) and hence may include one or more of the computer processors 620 (e.g., a set of processors provided by the client device 102).

Any one or more of the modules described may be implemented using hardware alone (e.g., one or more of the computer processors 620 of a machine (e.g., machine 1200) or a combination of hardware and software. For example, any described module of the messaging client application 104 may physically include an arrangement of one or more of the computer processors 620 (e.g., a subset of or among the one or more computer processors of the machine (e.g., machine 1200) configured to perform the operations described herein for that module. As another example, any module of the AR content system 600 may include software, hardware, or both, that configure an arrangement of one or more computer processors 620 (e.g., among the one or more computer processors of the machine (e.g., machine 1200) to perform the operations described herein for that module. Accordingly, different modules of the AR content system 600 may include and configure different arrangements of such computer processors 620 or a single arrangement of such computer processors 620 at different points in time. Moreover, any two or more modules of the messaging client application 104 may be combined into a single module, and the functions described herein for a single module may be subdivided among multiple modules. Furthermore, according to various example embodiments, modules described herein as being implemented within a single machine, database, or device may be distributed across multiple machines, databases, or devices.

The camera module 602 performs camera related operations, including functionality for operations involving one or more cameras of the client device 102. In an example, camera module 602 can access camera functionality across different processes that are executing on the client device 102, determining surfaces for face or surface tracking, responding to various requests (e.g., involving image data of a particular resolution or format) for camera data or image data (e.g., frames) from such processes, providing metadata to such processes that are consuming the requested camera data or image data. As mentioned herein, a "process" or "computing process" can refer to an instance of a computer program that is being executed by one or more threads of a given processor(s).

As mentioned herein, surface tracking refers to operations for tracking one or more representations of surfaces corresponding to planes (e.g., a given horizontal plane, a floor, a table) in the input frame. In an example, surface tracking is accomplished using hit testing and/or ray casting techniques. Hit testing, in an example, determines whether a selected point (e.g., pixel or set of pixels) in the input frame intersects with a surface or plane of a representation of a physical object in the input frame. Ray casting, in an example, utilizes a Cartesian based coordinate system (e.g., x and y coordinates) and projects a ray (e.g., vector) into the camera's view of the world, as captured in the input frame, to detect planes that the ray intersects.

As further illustrated, the camera module 602 receives the input frame (or alternatively a duplicate of the input frame in an embodiment). The camera module 602 can include various tracking functionality based on a type of object to track. In an example, the camera module 602 includes tracking capabilities for surface tracking, face tracking, object tracking, and the like. In an implementation, the camera module 602 may only execute one of each of a plurality of tracking processes at a time for facilitating the management of computing resources at the client device 102 or client device 102. In addition, the camera module 602 may perform one or more object recognition or detection operations on the input frame.

As referred to herein, tracking refers to operations for determining spatial properties (e.g., position and/or orientation) of a given object (or portion thereof) during a post-processing stage. In an implementation, during tracking, the object's position and orientation are measured in a continuous manner. Different objects may be tracked, such as a user's head, eyes, or limbs, surfaces, or other objects. Tracking involves dynamic sensing and measuring to enable virtual objects and/or effects to be rendered with respect to physical objects in a three-dimensional space corresponding to a scene (e.g., the input frame). Thus, the camera module 602 determines metrics corresponding to at least the relative position and orientation of one or more physical objects in the input frame and includes these metrics in tracking data which is provided to the rendering module 608. In an example, the camera module 602 updates (e.g., track over time) such metrics from frame to subsequent frame.

In an implementation, the camera module 602 provides, as output, tracking data (e.g., metadata) corresponding to the aforementioned metrics (e.g., position and orientation). In some instances, the camera module 602 includes logic for shape recognition, edge detection, or any other suitable object detection mechanism. The object of interest may also be determined by the camera module 602 to be an example of a predetermined object type, matching shapes, edges, or landmarks within a range to an object type of a set of predetermined object types.

In an implementation, the camera module 602 can utilize techniques which combines information from the device's motion sensors (e.g., accelerometer and gyroscope sensors, and the like) with an analysis of the scene provided in the input frame. For example, the camera module 602 detects features in the input frame, and as a result, tracks differences in respective positions of such features across several input frames using information derived at least in part on data from the motion sensors of the device.

As mentioned herein, face tracking refers to operations for tracking representations of facial features, such as portions of a user's face, in the input frame. In some embodiments, the camera module 602 includes facial tracking logic to identify all or a portion of a face within the one or more images and track landmarks of the face across the set of images of the video stream. As mentioned herein, object tracking refers to tracking a representation of a physical object in the input frame.

In an embodiment, the camera module 602 utilizes machine learning techniques to detect whether a physical object, corresponding to a representation of display screen, is included in captured image data (e.g., from a current field of view of the client device 102).

In an example, the camera module 602 utilizes a machine learning model such a neural network is utilized for detecting a representation of a display screen in the image data. A neural network model can refer to a feedforward deep neural network that is implemented to approximate a function $f$ Models in this regard are referred to as feedforward because information flows through the function being evaluated from an input x, through one or more intermediate operations used to define $f$, and finally to an output y. Feedforward deep neural networks are called networks because they may be represented by connecting together different operations. A model of the feedforward deep neural networks may be represented as a graph representing how the operations are connected together from an input layer, through one or more hidden layers, and finally to an output layer. Each node in such a graph represents an operation to be performed in an example. It is appreciated, however, that other types of neural networks are contemplated by the implementations described herein. For example, a recurrent neural network such as a long short-term memory (LSTM) neural network may be provided for annotation, or a convolutional neural network (CNN) may be utilized.

In an example, for computer vision techniques of the subject technology, the camera module 602 utilizes a convolutional neural network model to detect a representation of a display screen (or other applicable objects) in the image data. Such a convolutional neural network (CNN) can be trained using training data which includes thousands or millions of images of display screens such that the trained CNN can be provided with input data (e.g., image or video data) and perform tasks to detect the presence of a display screen(s) in the input data. A convolution operation involves finding local patterns in the input data, such as image data. Such patterns that are learned by the CNN therefore can be recognized in any other part of the image data, which advantageously provides translation invariant capabilities. For example, an image of a display screen viewed from the side can still produce a correct classification of a display screen as if the display screen was viewed frontally. Similarly, in cases of occlusion when an object (e.g., display screen) to be detected is partially blocked from view, the CNN is still able to detect the object in the image data.

In an embodiment, the camera module 602 acts as an intermediary between other components of the AR content system 600 and the capture module 604. As mentioned above, the camera module 602 can receive requests for captured image data from the image data processing module 606. The camera module 602 can also receive requests for the captured image data from the content recording module 610. The camera module 602 can forward such requests to the capture module 604 for processing.

The capture module 604 captures images (which may also include depth data) captured by one or more cameras of client device 102 (e.g., in response to the aforementioned requests from other components). For example, an image is a photograph captured by an optical sensor (e.g., camera) of the client device 102. An image includes one or more real-world features, such as a user's face or real-world object(s) detected in the image. In some embodiments, an image includes metadata describing the image. Each captured image can be included in a data structure mentioned herein as a "frame", which can include the raw image data along with metadata and other information. In an embodiment, capture module 604 can send captured image data and metadata as (captured) frames to one or more components of the AR content system 600.

The image data processing module 606 generates tracking data and other metadata for captured image data, including metadata associated with operations for generating AR content and AR effects applied to the captured image data. The image data processing module 606 performs operations on the received image data. For example, various image processing operations are performed by the image data processing module 606. The image data processing module 606 performs various operations based on algorithms or techniques that correspond to animations and/or providing visual and/or auditory effects to the received image data. In an embodiment, a given augmented reality content generator can utilize the image data processing module 606 to perform operations as part of generating AR content and AR effects which is then provided to a rendering process to render such AR content and AR effects (e.g., including 2D effects or 3D effects) and the like.

The rendering module 608 performs rendering of AR content for display by the messaging client application 104 based on data provided by at least one of the aforementioned modules. In an example, the rendering module 608 utilizes a graphical processing pipeline to perform graphical operations to render the AR content for display. The rendering module 608 implements, in an example, an extensible rendering engine which supports multiple image processing operations corresponding to respective augmented reality content generators. In an example, the rendering module 608 can receive a composite AR content for rendering on a display provided by client device 102.

In some implementations, the rendering module 608 provide a graphics system that renders two-dimensional (2D) objects or objects from a three-dimensional (3D) world (real or imaginary) onto a 2D display screen. Such a graphics system (e.g., one included on the client device 102) includes a graphics processing unit (GPU) in some implementations for performing image processing operations and rendering graphical elements for display.

In an implementation, the GPU includes a logical graphical processing pipeline, which can receive a representation of a 2D or 3D scene and provide an output of a bitmap that represents a 2D image for display. Existing application programming interfaces (APIs) have implemented graphical pipeline models. Examples of such APIs include the Open Graphics Library (OPENGL) API and the METAL API. The graphical processing pipeline includes a number of stages to convert a group of vertices, textures, buffers, and state information into an image frame on the screen. In an implementation, one of the stages of the graphical processing pipeline is a shader, which may be utilized as part of a particular augmented reality content generator that is applied to an input frame (e.g., image or video). A shader can be implemented as code running on a specialized processing unit, also referred to as a shader unit or shader processor, usually executing several computing threads, programmed to generate appropriate levels of color and/or special effects to fragments being rendered. For example, a vertex shader processes attributes (position, texture coordinates, color, etc.) of a vertex, and a pixel shader processes attributes (texture values, color, z-depth and alpha value) of a pixel. In some instances, a pixel shader is referred to as a fragment shader.

It is to be appreciated that other types of shader processes may be provided. In an example, a particular sampling rate is utilized, within the graphical processing pipeline, for rendering an entire frame, and/or pixel shading is performed at a particular per-pixel rate. In this manner, a given electronic device (e.g., the client device 102) operates the graphical processing pipeline to convert information corresponding to objects into a bitmap that can be displayed by the electronic device.

The content recording module 610 sends a request(s) to the camera module 602 to initiate recording of image data by one or more cameras provided by the client device 102. In an embodiment, the camera module 602 acts as intermediary between other components in the AR content recording system. For example, the camera module can receive a request from the content recording module 610 to initiate recording, and forward the request to the capture module 604 for processing. The capture module 604, upon receiving the request from the camera module 602, performs operations to initiate image data capture by the camera(s) provided by the client device 102. Captured image data, including timestamp information for each frame from the captured image data, can then be sent to the content recording module 610 for processing. In an example, the content recording module 610 can perform operations to process captured image data for rendering by the rendering module 608.

In an embodiment, components of the AR content system 600 can communicate using an inter-process communication (IPC) protocol. In an embodiment, components of the AR content system 600 can communicate through an API provided by the AR content system 600.

In an embodiment, the camera module 602 receives a signal or command (or a request) to stop recording of image data (e.g., sent from the content recording module 610). In response, the camera module 602 sends a request to the capture module 604 to stop capturing image data. The capture module 604, in response to the request to stop recording, complies with the request and ceases further operations to capture image data using one or more cameras of the client device 102. The camera module 602, after receiving the signal or command to stop recording, can also asynchronously send a signal to the image data processing module 606 that recording of image data (e.g., capture of image data by the capture module 604) has (requested to be) stopped. The image data processing module 606, after receiving the signal, performs operations to complete or finish image processing operations, including performing operations to generate metadata related to AR contents and AR effects. Such metadata can then be sent to the capture module 604, which then generates a composite AR content, including the metadata. The composite AR content can be received by the rendering module 608 and rendered for display on a display device provided by the client device 102.

As mentioned herein, the subject technology enables operations (e.g., image processing operations) related to facial animation synthesis as described by the following. Some embodiments of the disclosure may allow taking a source media content (e.g., image, video, and the like) of a first person ("source actor") and setting target photos (or video) of a second entity (hereinafter called "target actor" or "target entity" such as a second person as an input, and synthesizing animation of the target actor with facial mimics and head movements of the source actor. The subject technology enables the target actor to be animated and thereby mimic movements and facial expressions of the source actor. In an embodiment, the subject technology may be utilized in an entertainment or advertisement context where a user takes a selfie (e.g., media content comprising image or video) and the subject technology can select a scenario of animating the person and applying visual effects. The scenarios have different settings and source actor movements, which are transferred to the media content corresponding to the user selfie. The resulting media content (e.g., AR content including facial animation synthesis) can feature the user in different situations and locations. The user can share the AR content including facial animation synthesis with other users (e.g., friends). Additionally, the AR content including facial animation synthesis can be utilized as stickers (e.g., media overlay include AR content) in messaging applications (e.g., messaging client application 104) or social networking services (e.g., social network system 122), or as content for an online advertisement to be displayed in various situations as described further herein.

In some embodiments, the subject system can manipulate or modify the target face based on facial expressions of the source face by performing facial synthesis operations that enable a real-time mimicking of positions of the head of the source actor and facial expressions of the source actor. Further, in some embodiments, a technical improvement of the operation of a computing device includes significantly reducing a computation time for generating an AR content in which a face of the target entity mimics positions of the head of the source actor and facial expressions of the source actor and allow performing this generation of the AR content on a mobile device, which may have limited computing resources.

In some embodiments, the client device 102 can be configured to display a target media content (e.g., image or video). The target media content may include at least one frame including a face of a target entity in which to apply facial synthesis based on the face of the source actor (e.g., the user). In some embodiments, the target media content can include a single image (e.g., still or static image instead of a video). In some embodiments, the target media content can be pre-recorded and stored in a memory of the client device 102 or in a cloud-based computing resource to which the client device 102 is communicatively coupled to such as the messaging server system 108.

In an example, the camera module 602 can capture a source video, via, for example, the camera of the client device 102. The source video may include at least a face of the user (e.g., "source face"), and can be stored in the memory of the client device 102.

According to some embodiments, the client device 102 (e.g., image data processing module 606) or the messaging server system 108 can be configured to analyze stored images (e.g., a single image or multiple frames of a source video) of a given user in order to extract facial parameters of the user. The client device 102 or the messaging server system 108 can be further configured to modify a target video by replacing, based on the facial parameters of the user, the target face in the target video with the face of the user utilizing facial synthesis techniques.

Similarly, the client device 102 or the messaging server system 108 can be configured to analyze the stored images of the user to extract facial parameters of another individual (for example, a friend of the user). The client device 102 can be further configured to modify the target video by replacing, based on the facial parameters of the individual, the target face in the target video with the face of the individual utilizing facial synthesis techniques.

As mentioned herein, such facial synthesis techniques can include at least, for example, determining facial expressions and a head pose of a source actor, determining facial landmarks of the source actor and replacing identity parameters of the source actor with identity parameters of the target actor, utilizing machine learning models including neural networks, and generating a frame sequence (e.g., a video) of a realistic and plausible-looking head of the target actor which moves and express emotions (e.g., facial expressions or facial movements) that were extracted from the source actor.

Embodiments of the subject technology describe herein provide augmented reality content including facial synthesis, which can be provided by a third party application that is separate from the subject messaging system and any first party messaging applications. In the examples below, a first party application corresponds to a same entity (e.g., company, individual, application or service provider, and the like) that controls the subject messaging system. Thus, in this context, a third party application belongs to a different entity and may include particular functionality or features that are not natively supported by the subject messaging system. Embodiments of the subject technology therefore support interoperability between third party applications (e.g., developed and created by different organizations or entities) and the subject messaging system to leverage facial synthesis techniques that are natively supported by the subject messaging system (or by a first party messaging client application associated with the subject messaging system).

Figure 7:
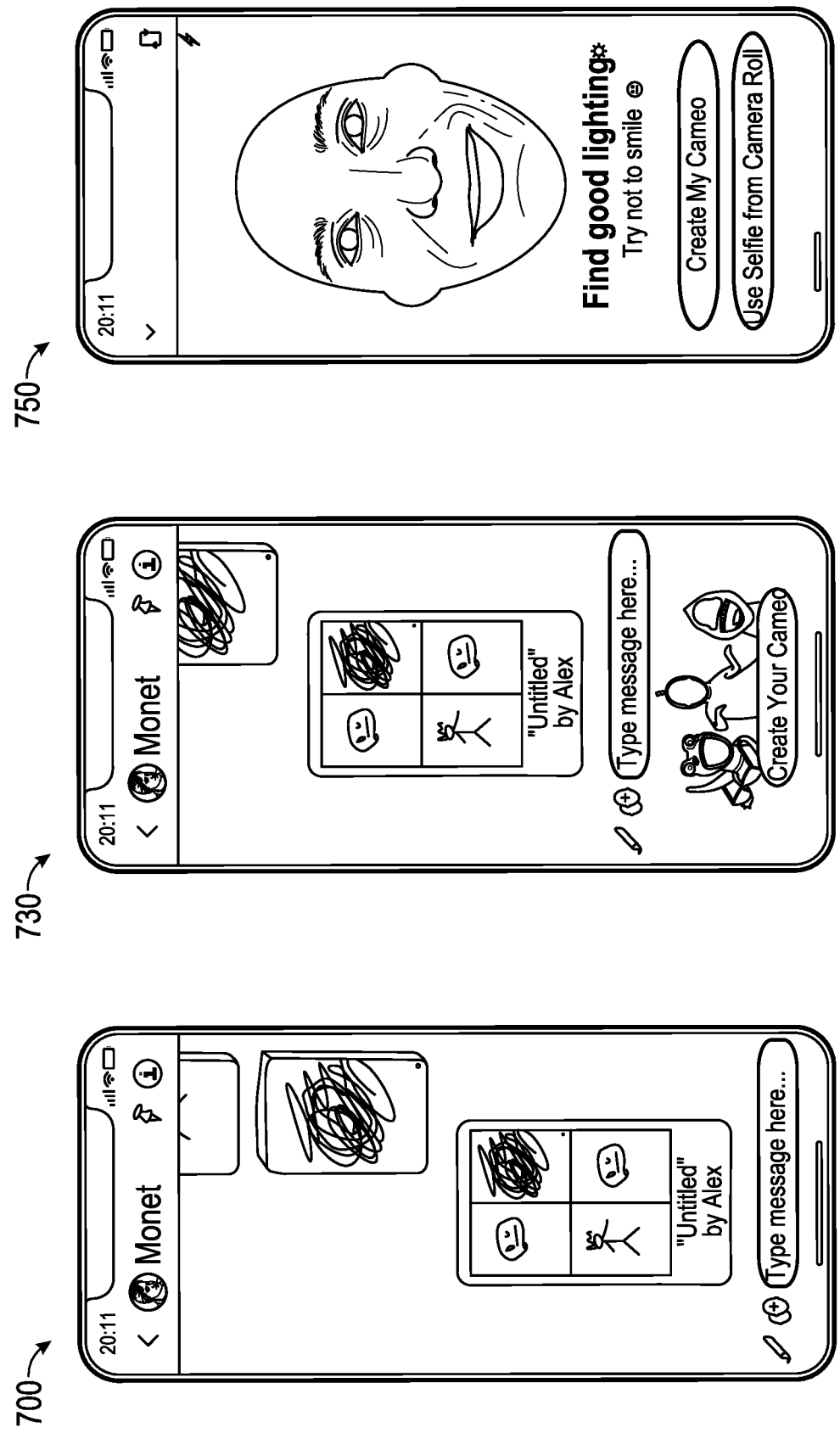
FIG. 7 illustrates example interfaces (e.g., graphical user interface), according to some embodiments.

FIG. 7 illustrates example interfaces (e.g., graphical user interface), according to some embodiments. In an embodiment, interface 700 and interface 750 are provided by a third party application. Such a third party application may include similar or the same components as the client device 102, the messaging client application 104, or the AR content system 600.

As shown, interface 700 includes graphical items provided in a third party application. For example, interface 700 includes a graphical item for text entry (e.g., corresponding to a third party keyboard application). Upon selection of the graphical item for text entry, as show in interface 730, a second graphical item (e.g., "create your cameo") is provided for creating augmented reality content including facial synthesis. In interface 750, after selection of the second graphical item, various graphical items are provided to initiate creation of the augmented reality content where one graphical item is an option to capture new image data, while another graphical item provides an option to utilize an existing image (or video). For example, the subject technology provides an interface (not shown) that enables a user to capture (e.g., record) an image or video including a selfie (e.g., user's face as a target face) with facial expressions and lip movements in order to match or mimic the facial expressions found in a given source video or image.

Figure 8:
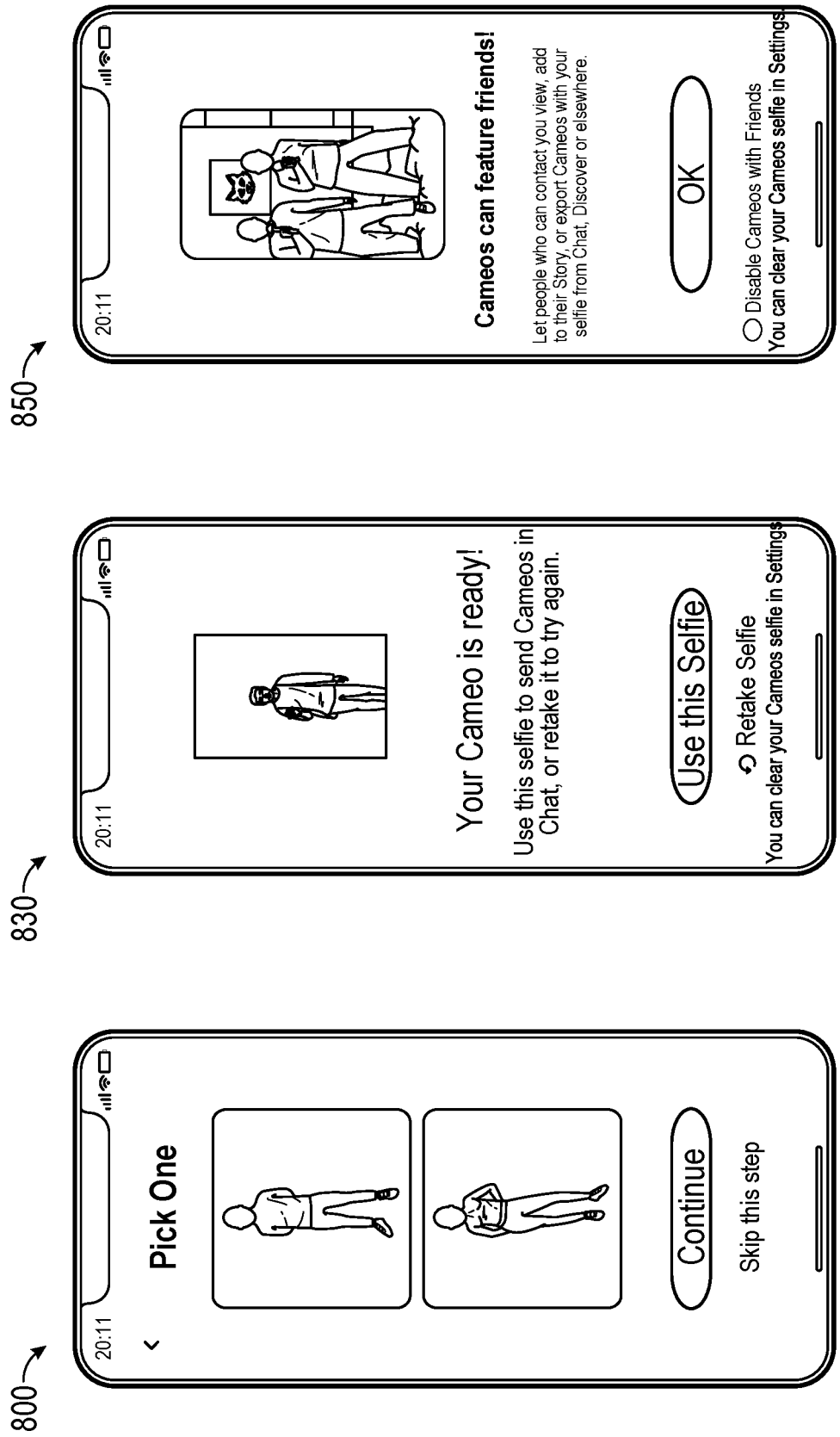
FIG. 8 illustrates example interfaces (e.g., graphical user interface), according to some embodiments.

FIG. 8 illustrates example interfaces (e.g., graphical user interface), according to some embodiments. In an embodiment, interface 800 and interface 850 are provided by a third party application. Such a third party application may include similar or the same components as the client device 102, the messaging client application 104, or the AR content system 600.

As shown, interface 800 is provided to enable the user to select a particular source media content or AR content with a source actor for facial synthesis which is provided as one or more respective selectable graphical items. In this example, when one of the graphical items, corresponding to a particular source content, is selected, the subject technology can modify a representation of the target face from the captured image data (e.g., using, in part, interface 750 described above), utilizing facial synthesis techniques, to mimic at least one of positions of a head of a source actor and at least one of facial expressions of the source actor in frames of a source media content. In some embodiments, this process generates AR content for the third party application where the third party application may communicate (e.g., via an application interface, and the like) with the subject messaging system to generate the AR content in cooperation with the subject messaging system.

As further shown, interface 830 shows an indication that AR content has been generated using facial synthesis techniques described above, and a selectable graphical item can be selected to use the generated AR content in the third party application.

In some embodiments, interface 850 is provided to notify a user that facial synthesis can be applied to other targets faces, such as a friend(s) of the user corresponding to the target face discussed above.

Figure 9:
FIG. 9 illustrates example interfaces (e.g., graphical user interface), according to some embodiments.

FIG. 9 illustrates an interface 900 (e.g., graphical user interface), according to some embodiments. In an embodiment, interface 900 is provided by a third party application. Such a third party application may include similar or the same components as the client device 102, the messaging client application 104, or the AR content system 600.

As shown, the generated augmented reality content is provided in interface 900 of the third party application. In this example, the third party application can comprise a keyboard application (or similar user input or text entry application) which displays a set of selectable graphical content items each representing particular AR content with facial synthesis based on a particular target face(s). In this manner, the third party application is enabled to provide AR content based on the type of application and the functionality provided by the third party application.

FIG. 10 is a flowchart illustrating a method 1000, according to certain example embodiments. The method 1000 may be embodied in computer-readable instructions for execution by one or more computer processors such that the operations of the method 1000 may be performed in part or in whole by the client device 102, particularly with respect to respective components of the AR content system 600 described above in FIG. 6; accordingly, the method 1000 is described below by way of example with reference thereto. However, it shall be appreciated that at least some of the operations of the method 1000 may be deployed on various other hardware configurations and the method 1000 is not intended to be limited to the AR content system 600.

At operation 1002, the image data processing module 606 receives a selection of a selectable graphical item to initiate generating augment reality content including facial synthesis, the selection being received by a third party application, the third party application being executed by a computing device separate from a first party application and a messaging server system 108 associated with the first party application, the first party application and the messaging server system 108 corresponding to a same entity.

At operation 1004, the capture module 604 captures image data by the computing device, the captured image data comprising a target face of a target actor and facial expressions of the target actor.

At operation 1006, the image data processing module 606 generates, based at least in part on frames of a source media content, sets of source pose parameters, the sets of the source pose parameters comprising positions of representations of a head of a source actor and facial expressions of the source actor in the frames of the source media content.

At operation 1008, the image data processing module 606 generates, based at least in part on sets of the source pose parameters, an output media content using an interface communicating with the messaging server system 108, each frame of the output media content including an image of the target face, from the captured image data, in at least one frame of the output media content, the image of the target face being modified based on at least one of the sets of the source pose parameters to mimic at least one of positions of the head of the source actor in the frames of the source media content. In the examples described in FIG. 10, the interface communicating with the messaging server system 108 can be implemented as a remote application programming interface (API), a communication interface between the third party application and the messaging server system 108, and the like.

At operation 1010, the rendering module 608 provides augmented reality content based at least in part on the output media content for display on the computing device.

In an embodiment, the rendering module 608 provides for display a set of selectable graphical items corresponding to source media content with a source actor for facial synthesis, wherein each selectable graphical item is associated with a respective source media content of a different source actor, the respective source media content of the different source actor including media content different from media content of each other different source actor associated with each selectable graphical item.

In an embodiment, the third party application receives a selection of a particular selectable graphical item from the set of selectable graphical items. In an embodiment, in response to the selection, the messaging server system 108 modifies the image of the target face based on the sets of the source pose parameters to mimic at least one of positions of the head of the source actor and facial expressions in the frames of the source media content.

In an embodiment, the image of the target face being modified is based on the messaging server system 108 generating, using a first encoder network, a first set of facial features based on a set of frames of the source media content, the generating producing a first set of image data of lower dimensionality than the frames of the source media content, wherein the lower dimensionality comprises a lower resolution than a particular resolution of the frames of the source media content.

In an embodiment, the messaging server system 108 generates, using a first decoder network associated with the target face, a first set of output images or frames included in the output media content, the first set of output images or frames comprising a first modification of representations of a head and a face of the target actor based on a particular set of facial features from the head of the source actor and facial expressions of the source actor.

In an embodiment, the first encoder network comprises a first deep convolutional neural network, the first decoder network comprises a second deep convolutional neural network, and the first deep convolutional neural network and the second deep convolutional neural network are different neural networks.

In an embodiment, modifying the image of the target face comprises: receiving, via the interface communicating with the messaging server system 108, a request from the third party application to modify the image of the target face, and in response to the request, performing, by the messaging server system 108, a set of operations to modify the image of the target face in each frame included in the output media content; and sending, via the interface by the messaging server system 108, the augmented reality content including the modified image of the target face in each frame of the output media content to the third party application.

In an embodiment, generating, using the first encoder network, the first set of facial features comprises: deploying, by the messaging server system 108, a first machine learning model corresponding to the first encoder network, wherein the first machine learning model is deployed at the messaging server system 108 for execution in a machine learning execution environment provided by the messaging server system 108; and causing, by the messaging server system 108, the first machine learning model to perform a set of operations to generate the first set of facial features.

In an embodiment, generating, using the first decoder network associated with the target face, the first set of output images or frames included in the output media content comprises: deploying, by the messaging server system 108, a second machine learning model corresponding to the first encoder network, wherein the second machine learning model is deployed at the messaging server system 108 for execution in a machine learning execution environment provided by the messaging server system 108; and causing, by the messaging server system 108, the second machine learning model to perform a set of operations to generate the first set of output images or frames included in the output media content.

In an embodiment, providing the augmented reality content based at least in part on the output media content for display on the computing device comprises: sending by the messaging server system 108, via the interface, the augmented reality content to the third party application; receiving, by the third party application, the augmented reality content; and rendering for display, by the third party application, the augmented reality content in a graphical interface of the third party application.

Figure 11:
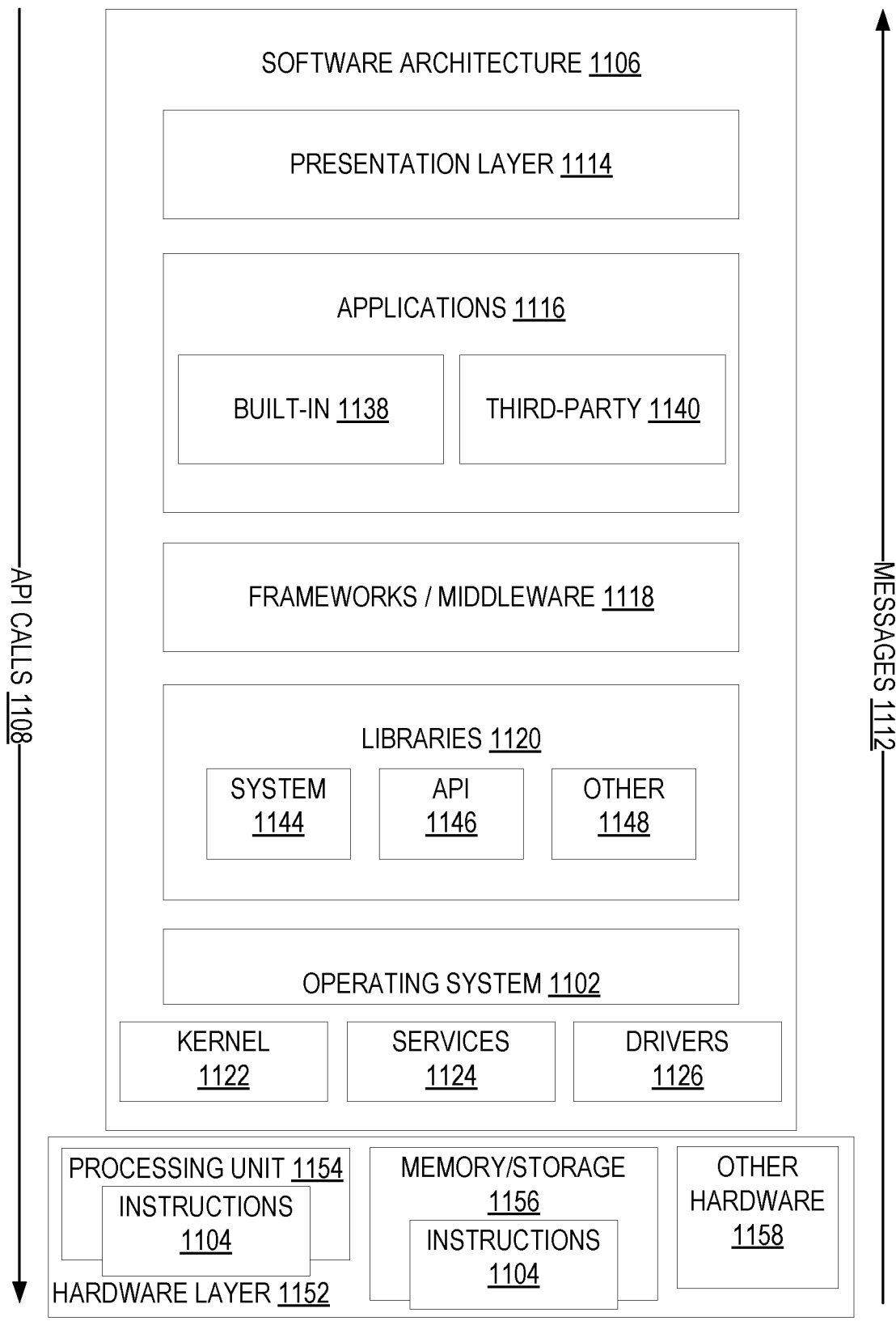
FIG. 11 is block diagram showing a software architecture within which the present disclosure may be implemented, in accordance with some example embodiments.

FIG. 11 is a block diagram illustrating an example software architecture 1106, which may be used in conjunction with various hardware architectures herein described. FIG. 11 is a non-limiting example of a software architecture and it will be appreciated that many other architectures may be implemented to facilitate the functionality described herein. The software architecture 1106 may execute on hardware such as machine 1200 of FIG. 12 that includes, among other things, processors 1204, memory 1214, and (input/output) I/O components 1218. A representative hardware layer 1152 is illustrated and can represent, for example, the machine 1200 of FIG. 12. The representative hardware layer 1152 includes a processing unit 1154 having associated executable instructions 1104. Executable instructions 1104 represent the executable instructions of the software architecture 1106, including implementation of the methods, components, and so forth described herein. The hardware layer 1152 also includes memory and/or storage modules memory/storage 1156, which also have executable instructions 1104. The hardware layer 1152 may also comprise other hardware 1158.

In the example architecture of FIG. 11, the software architecture 1106 may be conceptualized as a stack of layers where each layer provides particular functionality. For example, the software architecture 1106 may include layers such as an operating system 1102, libraries 1120, frameworks/middleware 1118, applications 1116, and a presentation layer 1114. Operationally, the applications 1116 and/or other components within the layers may invoke API calls 1108 through the software stack and receive a response as in messages 1112 to the API calls 1108. The layers illustrated are representative in nature and not all software architectures have all layers. For example, some mobile or special purpose operating systems may not provide a frameworks/middleware 1118, while others may provide such a layer. Other software architectures may include additional or different layers.

The operating system 1102 may manage hardware resources and provide common services. The operating system 1102 may include, for example, a kernel 1122, services 1124, and drivers 1126. The kernel 1122 may act as an abstraction layer between the hardware and the other software layers. For example, the kernel 1122 may be responsible for memory management, processor management (e.g., scheduling), component management, networking, security settings, and so on. The services 1124 may provide other common services for the other software layers. The drivers 1126 are responsible for controlling or interfacing with the underlying hardware. For instance, the drivers 1126 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1120 provide a common infrastructure that is used by the applications 1116 and/or other components and/or layers. The libraries 1120 provide functionality that allows other software components to perform tasks in an easier fashion than to interface directly with the underlying operating system 1102 functionality (e.g., kernel 1122, services 1124 and/or drivers 1126). The libraries 1120 may include system libraries 1144 (e.g., C standard library) that may provide functions such as memory allocation functions, string manipulation functions, mathematical functions, and the like. In addition, the libraries 1120 may include API libraries 1146 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1120 may also include a wide variety of other libraries 1148 to provide many other APIs to the applications 1116 and other software components/modules.

The frameworks/middleware 1118 (also sometimes referred to as middleware) provide a higher-level common infrastructure that may be used by the applications 1116 and/or other software components/modules. For example, the frameworks/middleware 1118 may provide various graphic user interface (GUI) functions, high-level resource management, high-level location services, and so forth. The frameworks/middleware 1118 may provide a broad spectrum of other APIs that may be used by the applications 1116 and/or other software components/modules, some of which may be specific to a particular operating system 1102 or platform.

The applications 1116 include built-in applications 1138 and/or third-party applications 1140. Examples of representative built-in applications 1138 may include, but are not limited to, a contacts application, a browser application, a book reader application, a location application, a media application, a messaging application, and/or a game application. Third-party applications 1140 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1140 may invoke the API calls 1108 provided by the mobile operating system (such as operating system 1102) to facilitate functionality described herein.

The applications 1116 may use built in operating system functions (e.g., kernel 1122, services 1124 and/or drivers 1126), libraries 1120, and frameworks/middleware 1118 to create user interfaces to interact with users of the system. Alternatively, or additionally, in some systems interactions with a user may occur through a presentation layer, such as presentation layer 1114. In these systems, the application/component 'logic' can be separated from the aspects of the application/component that interact with a user.

Figure 12:
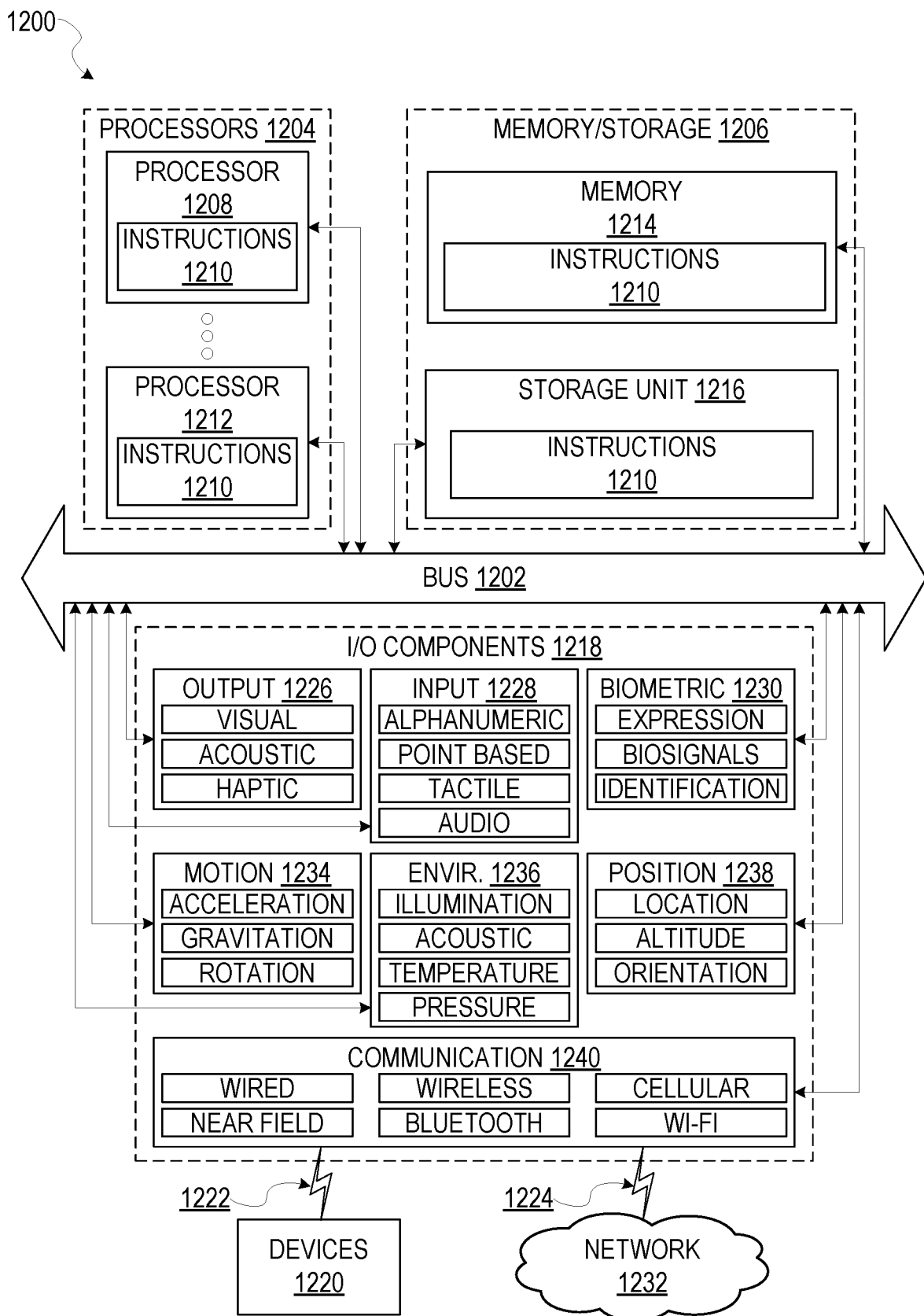
FIG. 12 is a diagrammatic representation of a machine, in the form of a computer system within which a set of instructions may be executed for causing the machine to perform any one or more of the methodologies discussed, in accordance with some example embodiments.

FIG. 12 is a block diagram illustrating components of a machine 1200, according to some example embodiments, able to read instructions from a machine-readable medium (e.g., a machine-readable storage medium) and perform any one or more of the methodologies discussed herein. Specifically, FIG. 12 shows a diagrammatic representation of the machine 1200 in the example form of a computer system, within which instructions 1210 (e.g., software, a program, an application, an applet, an app, or other executable code) for causing the machine 1200 to perform any one or more of the methodologies discussed herein may be executed. As such, the instructions 1210 may be used to implement modules or components described herein. The instructions 1210 transform the general, non-programmed machine 1200 into a particular machine 1200 programmed to carry out the described and illustrated functions in the manner described. In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1210, sequentially or otherwise, that specify actions to be taken by machine 1200. Further, while only a single machine 1200 is illustrated, the term 'machine' shall also be taken to include a collection of machines that individually or jointly execute the instructions 1210 to perform any one or more of the methodologies discussed herein.

The machine 1200 may include processors 1204, including processor 1208 to processor 1212, memory/storage 1206, and I/O components 1218, which may be configured to communicate with each other such as via a bus 1202. The memory/storage 1206 may include a memory 1214, such as a main memory, or other memory storage, and a storage unit 1216, both accessible to the processors 1204 such as via the bus 1202. The storage unit 1216 and memory 1214 store the instructions 1210 embodying any one or more of the methodologies or functions described herein. The instructions 1210 may also reside, completely or partially, within the memory 1214, within the storage unit 1216, within at least one of the processors 1204 (e.g., within the processor's cache memory), or any suitable combination thereof, during execution thereof by the machine 1200. Accordingly, the memory 1214, the storage unit 1216, and the memory of processors 1204 are examples of machine-readable media.

The I/O components 1218 may include a wide variety of components to receive input, provide output, produce output, transmit information, exchange information, capture measurements, and so on. The specific I/O components 1218 that are included in a particular machine 1200 will depend on the type of machine. For example, portable machines such as mobile phones will likely include a touch input device or other such input mechanisms, while a headless server machine will likely not include such a touch input device. It will be appreciated that the I/O components 1218 may include many other components that are not shown in FIG. 12. The I/O components 1218 are grouped according to functionality merely for simplifying the following discussion and the grouping is in no way limiting. In various example embodiments, the I/O components 1218 may include output components 1226 and input components 1228. The output components 1226 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1228 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1218 may include biometric components 1230, motion components 1234, environmental components 1236, or position components 1238 among a wide array of other components. For example, the biometric components 1230 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1234 may include acceleration sensor components (e.g., accelerometer), gravitation sensor components, rotation sensor components (e.g., gyroscope), and so forth. The environmental components 1236 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1238 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1218 may include communication components 1240 operable to couple the machine 1200 to a network 1232 or devices 1220 via coupling 1224 and coupling 1222, respectively. For example, the communication components 1240 may include a network interface component or other suitable device to interface with the network 1232. In further examples, communication components 1240 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1220 may be another machine or any of a wide variety of peripheral devices (e.g., a peripheral device coupled via a USB).

Moreover, the communication components 1240 may detect identifiers or include components operable to detect identifiers. For example, the communication components 1240 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1240, such as, location via Internet Protocol (IP) geo-location, location via Wi-Fi® signal triangulation, location via detecting a NFC beacon signal that may indicate a particular location, and so forth.

The following discussion relates to various terms or phrases that are mentioned throughout the subject disclosure.

'Signal Medium' refers to any intangible medium that is capable of storing, encoding, or carrying the instructions for execution by a machine and includes digital or analog communications signals or other intangible media to facilitate communication of software or data. The term 'signal medium' shall be taken to include any form of a modulated data signal, carrier wave, and so forth. The term 'modulated data signal' means a signal that has one or more of its characteristics set or changed in such a matter as to encode information in the signal. The terms 'transmission medium' and 'signal medium' mean the same thing and may be used interchangeably in this disclosure.

'Communication Network' refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

'Processor' refers to any circuit or virtual circuit (a physical circuit emulated by logic executing on an actual processor) that manipulates data values according to control signals (e.g., 'commands', 'op codes', 'machine code', etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as 'cores') that may execute instructions contemporaneously.

'Machine-Storage Medium' refers to a single or multiple storage devices and/or media (e.g., a centralized or distributed database, and/or associated caches and servers) that store executable instructions, routines and/or data. The term shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms 'machine-storage medium,' 'device-storage medium,' 'computer-storage medium' mean the same thing and may be used interchangeably in this disclosure. The terms 'machine-storage media,' 'computer-storage media,' and 'device-storage media' specifically exclude carrier waves, modulated data signals, and other such media, at least some of which are covered under the term 'signal medium.'

'Component' refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A 'hardware component' is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase 'hardware component'(or 'hardware-implemented component') should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, 'processor-implemented component' refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a 'cloud computing' environment or as a 'software as a service' (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

'Carrier Signal' refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

'Computer-Readable Medium' refers to both machine-storage media and transmission media. Thus, the terms include both storage devices/media and carrier waves/modulated data signals. The terms 'machine-readable medium,' 'computer-readable medium' and 'device-readable medium' mean the same thing and may be used interchangeably in this disclosure.

'Client Device' refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network. In the subject disclosure, a client device is also referred to as an 'electronic device.'

'Ephemeral Message' refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

'Signal Medium' refers to any intangible medium that is capable of storing, encoding, or carrying the instructions for execution by a machine and includes digital or analog communications signals or other intangible media to facilitate communication of software or data. The term 'signal medium' shall be taken to include any form of a modulated data signal, carrier wave, and so forth. The term 'modulated data signal' means a signal that has one or more of its characteristics set or changed in such a matter as to encode information in the signal. The terms 'transmission medium' and 'signal medium' mean the same thing and may be used interchangeably in this disclosure.

'Communication Network' refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

'Processor' refers to any circuit or virtual circuit (a physical circuit emulated by logic executing on an actual processor) that manipulates data values according to control signals (e.g., 'commands', 'op codes', 'machine code', etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as 'cores') that may execute instructions contemporaneously.

'Machine-Storage Medium' refers to a single or multiple storage devices and/or media (e.g., a centralized or distributed database, and/or associated caches and servers) that store executable instructions, routines and/or data. The term shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms 'machine-storage medium,' 'device-storage medium,' 'computer-storage medium' mean the same thing and may be used interchangeably in this disclosure. The terms 'machine-storage media,' 'computer-storage media,' and 'device-storage media' specifically exclude carrier waves, modulated data signals, and other such media, at least some of which are covered under the term 'signal medium.'

'Component' refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A 'hardware component' is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase 'hardware component'(or 'hardware-implemented component') should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, 'processor-implemented component' refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a 'cloud computing' environment or as a 'software as a service' (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

'Carrier Signal' refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

'Computer-Readable Medium' refers to both machine-storage media and transmission media. Thus, the terms include both storage devices/media and carrier waves/modulated data signals. The terms 'machine-readable medium,' 'computer-readable medium' and 'device-readable medium' mean the same thing and may be used interchangeably in this disclosure.

'Client Device' refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

'Ephemeral Message' refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

What is claimed is:

1. A method, comprising:
  providing for display a first graphical interface in a third party application, the first graphical interface including at least a first selectable graphical item for text entry, the third party application being executed by a computing device separate from a first party application and a messaging server system associated with the first party application, the first party application and the messaging server system corresponding to a same entity;
  receiving a selection of the first selectable graphical item;
  in response to receiving the selection of the first selectable graphical item, providing for display a second graphical interface in the third party application, the second graphical display including at least a second selectable graphical item to initiate generating augment reality content including facial synthesis;
  receiving, by one or more hardware processors, a selection of the second selectable graphical item to initiate generating augment reality content including facial synthesis, the selection of the second selectable graphical item being received by the third party application;
  capturing, by one or more hardware processors, image data by the computing device, the captured image data comprising a target face of a target actor and facial expressions of the target actor;
  generating, by the one or more hardware processors and based at least in part on frames of a source media content, sets of source pose parameters, the sets of the source pose parameters comprising positions of representations of a head of a source actor and facial expressions of the source actor in the frames of the source media content;
  generating, based at least in part on sets of the source pose parameters, by the one or more hardware processors, an output media content using an interface communicating with the messaging server system, each frame of the output media content including an image of the target face, from the captured image data, in at least one frame of the output media content, the image of the target face being modified based on at least one of the sets of the source pose parameters to mimic at least one of positions of the head of the source actor and facial expressions in the frames of the source media content; and
  providing, by the one or more hardware processors, augmented reality content based at least in part on the output media content for display on the computing device.

2. The method of claim 1, further comprising:
  providing for display a set of selectable graphical items corresponding to source media content with a source actor for facial synthesis, wherein each selectable graphical item is associated with a respective source media content of a different source actor, the respective source media content of the different source actor including media content different from media content of each other different source actor associated with each selectable graphical item.

3. The method of claim 2, further comprising:
  receiving, by the third party application, a selection of a particular selectable graphical item from the set of selectable graphical items; and
  in response to the selection, modifying, by the messaging server system, the image of the target face based on the sets of the source pose parameters to mimic at least one of positions of the head of the source actor and facial expressions in the frames of the source media content.

4. The method of claim 3, wherein the image of the target face being modified is based on generating, using a first encoder network, a first set of facial features based on a set of frames of the source media content, the generating producing a first set of image data of lower dimensionality than the frames of the source media content, wherein the lower dimensionality comprises a lower resolution than a particular resolution of the frames of the source media content.

5. The method of claim 4, further comprising:
  generating, using a first decoder network associated with the target face, a first set of output images or frames included in the output media content, the first set of output images or frames comprising a first modification of representations of a head and a face of the target actor based on a particular set of facial features from the head of the source actor and facial expressions of the source actor.

6. The method of claim 5, wherein the first encoder network comprises a first deep convolutional neural network, the first decoder network comprises a second deep convolutional neural network, and
  the first deep convolutional neural network and the second deep convolutional neural network are different neural networks.

7. The method of claim 3, wherein modifying the image of the target face comprises:
  receiving, via the interface communicating with the messaging server system, a request from the third party application to modify the image of the target face;

in response to the request, performing, by the messaging server system, a set of operations to modify the image of the target face in each frame included in the output media content; and sending, via the interface by the messaging server system, the augmented reality content including the modified image of the target face in each frame of the output media content to the third party application.

8. The method of claim 4, wherein generating, using the first encoder network, the first set of facial features comprises:

deploying, by the messaging server system, a first machine learning model corresponding to the first encoder network, wherein the first machine learning model is deployed at the messaging server system for execution in a machine learning execution environment provided by the messaging server system; and causing, by the messaging server system, the first machine learning model to perform a set of operations to generate the first set of facial features.

9. The method of claim 5, wherein generating, using the first decoder network associated with the target face, the first set of output images or frames included in the output media content comprises:

deploying, by the messaging server system, a second machine learning model corresponding to the first encoder network, wherein the second machine learning model is deployed at the messaging server system for execution in a machine learning execution environment provided by the messaging server system; and causing, by the messaging server system, the second machine learning model to perform a set of operations to generate the first set of output images or frames included in the output media content.

10. The method of claim 1, wherein providing the augmented reality content based at least in part on the output media content for display on the computing device comprises:

sending by the messaging server system, via the interface, the augmented reality content to the third party application;

receiving, by the third party application, the augmented reality content; and rendering for display, by the third party application, the augmented reality content in a graphical interface of the third party application.

11. A system comprising:

a processor; and a memory including instructions that, when executed by the processor, cause the processor to perform operations comprising:

providing for display a first graphical interface in a third party application, the first graphical interface including at least a first selectable graphical item for text entry, the third party application being executed by a computing device separate from a first party application and a messaging server system associated with the first party application, the first party application and the messaging server system corresponding to a same entity;

receiving a selection of the first selectable graphical item;

in response to receiving the selection of the first selectable graphical item, providing for display a second graphical interface in the third party application, the second graphical display including at least a second selectable graphical item to initiate generating augment reality content including facial synthesis;

receiving, by one or more hardware processors, a selection of the second selectable graphical item to initiate generating augment reality content including facial synthesis, the selection of the second selectable graphical item being received by the third party application;

capturing, by one or more hardware processors, image data by the computing device, the captured image data comprising a target face of a target actor and facial expressions of the target actor;

generating, by the one or more hardware processors and based at least in part on frames of a source media content, sets of source pose parameters, the sets of the source pose parameters comprising positions of representations of a head of a source actor and facial expressions of the source actor in the frames of the source media content;

generating, based at least in part on sets of the source pose parameters, by the one or more hardware processors, an output media content using an interface communicating with the messaging server system, each frame of the output media content including an image of the target face, from the captured image data, in at least one frame of the output media content, the image of the target face being modified based on at least one of the sets of the source pose parameters to mimic at least one of positions of the head of the source actor and facial expressions in the frames of the source media content; and providing, by the one or more hardware processors, augmented reality content based at least in part on the output media content for display on the computing device.

12. The system of claim 11, wherein the operations further comprise:

providing for display a set of selectable graphical items corresponding to source media content with a source actor for facial synthesis, wherein each selectable graphical item is associated with a respective source media content of a different source actor, the respective source media content of the different source actor including media content different from media content of each other different source actor associated with each selectable graphical item.

13. The system of claim 12, wherein the operations further comprise:

receiving, by the third party application, a selection of a particular selectable graphical item from the set of selectable graphical items; and in response to the selection, modifying, by the messaging server system, the image of the target face based on the sets of the source pose parameters to mimic at least one of positions of the head of the source actor and facial expressions in the frames of the source media content.

14. The system of claim 13, wherein the image of the target face being modified is based on generating, using a first encoder network, a first set of facial features based on a set of frames of the source media content, the generating producing a first set of image data of lower dimensionality than the frames of the source media content, wherein the lower dimensionality comprises a lower resolution than a particular resolution of the frames of the source media content.

15. The system of claim 14, wherein the operations further comprise:

generating, using a first decoder network associated with the target face, a first set of output images or frames included in the output media content, the first set of output images or frames comprising a first modification of representations of a head and a face of the target actor based on a particular set of facial features from the head of the source actor and facial expressions of the source actor.

16. The system of claim 15, wherein the first encoder network comprises a first deep convolutional neural network, the first decoder network comprises a second deep convolutional neural network, and the first deep convolutional neural network and the second deep convolutional neural network are different neural networks.

17. The system of claim 13, wherein modifying the image of the target face comprises:

receiving, via the interface communicating with the messaging server system, a request from the third party application to modify the image of the target face;

in response to the request, performing, by the messaging server system, a set of operations to modify the image of the target face in each frame included in the output media content; and sending, via the interface by the messaging server system, the augmented reality content including the modified image of the target face in each frame of the output media content to the third party application.

18. The system of claim 14, wherein generating, using the first encoder network, the first set of facial features comprises:

deploying, by the messaging server system, a first machine learning model corresponding to the first encoder network, wherein the first machine learning model is deployed at the messaging server system for execution in a machine learning execution environment provided by the messaging server system; and causing, by the messaging server system, the first machine learning model to perform a set of operations to generate the first set of facial features.

19. The system of claim 15, wherein generating, using the first decoder network associated with the target face, the first set of output images or frames included in the output media content comprises:

deploying, by the messaging server system, a second machine learning model corresponding to the first encoder network, wherein the second machine learning model is deployed at the messaging server system for execution in a machine learning execution environment provided by the messaging server system; and causing, by the messaging server system, the second machine learning model to perform a set of operations to generate the first set of output images or frames included in the output media content.

20. A non-transitory computer-readable medium comprising instructions, which when executed by a computing device, cause the computing device to perform operations comprising:

providing for display a first graphical interface in a third party application, the first graphical interface including at least a first selectable graphical item for text entry, the third party application being executed by a computing device separate from a first party application and a messaging server system associated with the first party application, the first party application and the messaging server system corresponding to a same entity;

receiving a selection of the first selectable graphical item;

in response to receiving the selection of the first selectable graphical item, providing for display a second graphical interface in the third party application, the second graphical display including at least a second selectable graphical item to initiate generating augment reality content including facial synthesis;

receiving, by one or more hardware processors, a selection of the second selectable graphical item to initiate generating augment reality content including facial synthesis, the selection of the second selectable graphical item being received by the third party application;

capturing, by one or more hardware processors, image data by the computing device, the captured image data comprising a target face of a target actor and facial expressions of the target actor;

generating, by the one or more hardware processors and based at least in part on frames of a source media content, sets of source pose parameters, the sets of the source pose parameters comprising positions of representations of a head of a source actor and facial expressions of the source actor in the frames of the source media content;

generating, based at least in part on sets of the source pose parameters, by the one or more hardware processors, an output media content using an interface communicating with the messaging server system, each frame of the output media content including an image of the target face, from the captured image data, in at least one frame of the output media content, the image of the target face being modified based on at least one of the sets of the source pose parameters to mimic at least one of positions of the head of the source actor and facial expressions in the frames of the source media content; and providing, by the one or more hardware processors, augmented reality content based at least in part on the output media content for display on the computing device.

* * * * *